United States Patent
Kondo

(10) Patent No.: US 12,072,613 B2
(45) Date of Patent: Aug. 27, 2024

(54) LENS BARREL

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

(*) Notice: Subject to any disclaimer, the term of this patent is extended or adjusted under 35 U.S.C. 154(b) by 698 days.

(21) Appl. No.: 17/214,667

(22) Filed: Mar. 26, 2021

(65) Prior Publication Data

US 2021/0215999 A1 Jul. 15, 2021

Related U.S. Application Data

(63) Continuation of application No. PCT/JP2019/041610, filed on Oct. 24, 2019.

(30) Foreign Application Priority Data

Oct. 25, 2018 (JP) .................. 2018-201029

(51) Int. Cl.
  *G03B 17/14* (2021.01)
  *G02B 7/10* (2021.01)
  *H04N 23/55* (2023.01)

(52) U.S. Cl.
  CPC ............... *G03B 17/14* (2013.01); *G02B 7/10* (2013.01); *H04N 23/55* (2023.01)

(58) Field of Classification Search
  CPC ........ G03B 17/14; G03B 17/565; G03B 3/02; G03B 2205/0046; G02B 7/10; H04N 23/55; H01H 19/20
  See application file for complete search history.

(56) References Cited

U.S. PATENT DOCUMENTS

2001/0020575 A1  9/2001 Sato et al.
2012/0076486 A1  3/2012 Bai et al.
(Continued)

FOREIGN PATENT DOCUMENTS

CN  102419504 A  4/2012
CN  102472945 A  5/2012
(Continued)

OTHER PUBLICATIONS

International Preliminary Report on Patentability issued in PCT/JP2019/041610; completed Apr. 28, 2020.
(Continued)

*Primary Examiner* — Wyatt A Stoffa
*Assistant Examiner* — Ray Alexander Dean
(74) *Attorney, Agent, or Firm* — Studebaker & Brackett PC

(57) ABSTRACT

There is provided a lens barrel from which stable operation feeling of an operation ring is obtained regardless of part accuracy. A stop ring (6) is provided with a ring-shaped multipolar magnet (12) that is magnetized to have multiple poles at regular angular intervals in a circumferential direction. A stationary frame (7) is provided with a sheet metal part (13). The sheet metal part (13) includes a body portion (24A) and a protrusion portion (13B). The body portion (24A) is disposed on a flange (8) of the stationary frame (7), and the protrusion portion (13B) is disposed on the outer periphery of the stationary frame (7). The stop ring (6) is click-stopped at regular angular intervals by a magnetic attractive force acting between the multipolar magnet (12) and the protrusion portion (13B) of the sheet metal part (13). Further, the stop ring (6) is attracted to the flange (8) of the stationary frame (7) by the magnetic attractive force acting between the multipolar magnet (12) and the body portion
(Continued)

(24A) of the sheet metal part (13), so that backlash is removed.

24 Claims, 21 Drawing Sheets

(56) References Cited

U.S. PATENT DOCUMENTS

| | | |
|---|---|---|
| 2012/0155843 A1 | 6/2012 | Takizawa |
| 2013/0249326 A1 | 9/2013 | Kirihara et al. |
| 2015/0221426 A1 | 8/2015 | Furuki et al. |

FOREIGN PATENT DOCUMENTS

| | | | | |
|---|---|---|---|---|
| CN | 103370860 A | | 10/2013 | |
| CN | 104820463 A | | 8/2015 | |
| JP | 1979-056097 U | | 4/1979 | |
| JP | S60-148626 U | | 10/1985 | |
| JP | H06-201978 A | | 7/1994 | |
| JP | H08-116478 A | | 5/1996 | |
| JP | 2001-254812 A | | 9/2001 | |
| JP | 2007-151367 A | | 6/2007 | |
| JP | 2009-283414 A | | 12/2009 | |
| JP | 2010-176971 A | | 8/2010 | |
| JP | 2010193568 A | * | 9/2010 | |
| JP | 4671098 B2 | * | 4/2011 | |
| JP | 2011081426 A | * | 4/2011 | ............... G02B 7/08 |
| JP | 2012-203340 A | | 10/2012 | |
| JP | 2012203340 A | * | 10/2012 | |
| JP | 2013-137505 A | | 7/2013 | |
| JP | 2014-229468 A | | 12/2014 | |
| JP | 2014229468 A | * | 12/2014 | |
| JP | 2016157031 A | * | 9/2016 | |
| JP | 2016-219165 A | | 12/2016 | |

OTHER PUBLICATIONS

An Office Action; "Notice of Reasons for Refusal," mailed by the Japanese Patent Office on Nov. 30, 2022, which corresponds to Japanese Patent Application No. 2022-070911 and is related to U.S. Appl. No. 17/214,667; with English language translation.

Office Action issued in CN 201980069965.7; mailed by the State Intellectual Property Office of People's Republic of China on Jun. 30, 2022.

An Office Action; "Notice of Reasons for Refusal," mailed by the Japanese Patent Office on Jan. 27, 2023, which corresponds to Japanese Patent Application No. 2022-070911 and is related to U.S. Appl. No. 17/214,667; with English language translation.

\* cited by examiner

/ LENS BARREL

CROSS-REFERENCE TO RELATED APPLICATIONS

The present application is a Continuation of PCT International Application No. PCT/JP2019/041610 filed on Oct. 24, 2019 claiming priority under 35 U.S.C § 119(a) to Japanese Patent Application No. 2018-201029 filed on Oct. 25, 2018. Each of the above applications is hereby expressly incorporated by reference, in its entirety, into the present application.

BACKGROUND OF THE INVENTION

1. Field of the Invention

The present invention relates to a lens barrel, and more particularly, to a lens barrel comprising an operation ring.

2. Description of the Related Art

Generally, an operation ring (stop ring) for operating a stop is provided with a click mechanism (referred to as a click stop mechanism). This type of click mechanism includes a plurality of click grooves that are provided at regular angular intervals in a circumferential direction and a click ball that is to be biased and fitted to the click grooves by a spring (for example, JP2013-137505A and the like).

However, the click mechanism including the click grooves and the click ball has a drawback that the number of parts is large and a lot of time and effort is required for assembly. Further, the click mechanism also has a drawback that it is difficult to manage accuracy due to a large number of parts and variations in click feeling are likely to occur among products. Furthermore, the click mechanism also has a drawback that operation feeling deteriorates or dust is generated due to abrasion caused by the sliding of the click ball.

On the other hand, click mechanisms using a magnetic force are proposed in JP2016-219165A, JP2010-176971A, and JP1996-116478A (JP-H08-116478A) as a click mechanism for a rotary dial. This click mechanism includes a plurality of magnets that are arranged at regular angular intervals in a circumferential direction, and a magnetic body or a magnet that is disposed so as to face the magnet.

SUMMARY OF THE INVENTION

In a case where the click mechanism using a magnetic force is applied to an operation ring, the operation ring needs to be assembled without backlash in order to obtain more stable operation feeling. For this purpose, high part accuracy is required.

The invention has been made in consideration of the above-mentioned circumstances, and an object of the invention is to provide a lens barrel from which stable operation feeling of an operation ring is obtained regardless of part accuracy.

Means for solving the problem are as follows.

(1) A lens barrel comprising:
a stationary frame;
an operation ring that is radially fitted to an outer periphery of the stationary frame;
an end face-contact portion which is provided on the stationary frame and with which an end face of the operation ring is in contact;
one or more magnet portions that are provided on the operation ring at regular angular intervals in a circumferential direction;
a first magnetic portion that is provided on the stationary frame and causes the operation ring to be click-stopped by a magnetic attractive force acting between the first magnetic portion and the magnet portion: and
a second magnetic portion that is provided on the end face-contact portion and attracts the operation ring to the end face-contact portion by a magnetic attractive force acting between the second magnetic portion and the magnet portion to cause the operation ring to be in contact with the end face-contact portion.

According to this aspect, a magnetic attractive force acts between the magnet portions provided on the operation ring and the first magnetic portion provided on the stationary frame. As a result, in a case where the operation ring is rotated, click feeling is generated at regular angular intervals. The regular angular interval mentioned here includes an angular interval that is recognized as a substantially regular angular interval. Further, according to this aspect, a magnetic attractive force acts between the magnet portions provided on the operation ring and the second magnetic portion provided on the end face-contact portion. As a result, the operation ring is attracted to the end face-contact portion and is in contact with the end face-contact portion. Accordingly, since the backlash of the operation ring is removed, stable operation feeling without variations is obtained.

(2) The lens barrel according to (1),
in which the magnetic attractive force acting between the second magnetic portion and the magnet portion is set to be smaller than the magnetic attractive force acting between the first magnetic portion and the magnet portion.

According to this aspect, the magnetic attractive force acting between the second magnetic portion and the magnet portion is set to be smaller than the magnetic attractive force acting between the first magnetic portion and the magnet portion. Accordingly, since friction generated between the operation ring and the end face-contact portion can be reduced, a smoother rotating operation can be achieved. Since an object of the magnetic attractive force acting between the second magnetic portion and the magnet portion is to remove backlash, it is preferable that the magnetic attractive force is set in a range where the object can be achieved.

(3) The lens barrel according to (1) or (2),
in which the operation ring is formed of an integrally molded product in which the magnet portions are insert-molded and which is made of a resin.

According to this aspect, the magnet portions are insert-molded in the operation ring, so that the magnet portions and the operation ring are formed as an integrally molded product. Accordingly, the man-hours for assembly can be reduced.

(4) The lens barrel according to (1) or (2),
in which the operation ring is formed of an integrally molded product in which the magnet portions are molded in two colors using a bonded magnet and which is made of a resin.

According to this aspect, the magnet portions are integrally molded with the operation ring using a bonded magnet by two-color molding. Accordingly, the man-hours for assembly can be reduced.

(5) The lens barrel according to any one of (1) to (4),
in which the stationary frame and the end face-contact portion are formed of an integrally molded product in which the first magnetic portion and the second magnetic portion are insert-molded and which is made of a resin.

According to this aspect, the stationary frame and the end face-contact portion are formed of an integrally molded product made of a resin, and the first magnetic portion and the second magnetic portion are integrally molded by insert molding. Accordingly, the man-hours for assembly can be reduced.

(6) The lens barrel according to any one of (1) to (5), in which the first magnetic portion and the second magnetic portion are formed of an integrally molded product made of a magnetic material.

According to this aspect, the first magnetic portion and the second magnetic portion are formed of an integrally molded product made of a magnetic material. Accordingly, the man-hours for assembly can be reduced.

(7) The lens barrel according to (6),
in which the second magnetic portion has a shape of a ring or an arc that is radially fitted to the outer periphery of the stationary frame, and
the first magnetic portion has a shape of a plate that extends in a direction of an optical axis along an outer peripheral surface of the stationary frame from the second magnetic portion.

According to this aspect, the second magnetic portion has a shape of a ring or an arc that is radially fitted to the outer periphery of the stationary frame. Further, the first magnetic portion has a shape of a plate that extends in a direction of an optical axis along an outer peripheral surface of the stationary frame from the second magnetic portion.

(8) The lens barrel according to any one of (1) to (7),
in which each of the first magnetic portion and the second magnetic portion is formed of a ferromagnetic body.

According to this aspect, each of the first magnetic portion and the second magnetic portion is formed of a ferromagnetic body (for example, iron or the like).

(9) The lens barrel according to any one of (1) to (8),
in which the magnet portions are formed of a ring-shaped or arcuate multipolar magnet that is magnetized to have multiple poles in the circumferential direction.

According to this aspect, the magnet portions are formed of a ring-shaped or arcuate multipolar magnet that is magnetized to have multiple poles in the circumferential direction.

(10) The lens barrel according to any one of (1) to (9), further comprising:
a rotation detection unit that detects a change of magnetic flux caused by a rotation of the operation ring to detect the rotation of the operation ring corresponding to each click.

According to this aspect, the rotation of the operation ring corresponding to each click is detected using the magnet portions provided on the operation ring.

(11) The lens barrel according to any one of (1) to (10),
in which the magnet portion includes one or more first magnet portions that are provided at a first angular interval in the circumferential direction and one or more second magnet portions that are provided at a second angular interval between the adjacent first magnet portions, and
a magnetic attractive force acting between the first magnet portion and the first magnetic portion is set to be larger than a magnetic attractive force acting between the second magnet portion and the first magnetic portion.

According to this aspect, the magnet portion includes the first magnet portions and the second magnet portions, and different click feeling is generated at the first magnet portions and the second magnet portions.

(12) The lens barrel according to (11),
in which clearance provided between the first magnet portion and the first magnetic portion is set to be narrower than clearance provided between the second magnet portion and the first magnetic portion, so that the magnetic attractive force acting between the first magnet portion and the first magnetic portion is set to be larger than the magnetic attractive force acting between the second magnet portion and the first magnetic portion.

According to this aspect, click feeling is adjusted through the adjustment of the clearance from the first magnetic portion.

(13) The lens barrel according to (11),
in which an area of a region where the first magnet portion and the first magnetic portion overlap with each other is set to be larger than an area of a region where the second magnet portion and the first magnetic portion overlap with each other, so that the magnetic attractive force acting between the first magnet portion and the first magnetic portion is set to be larger than the magnetic attractive force acting between the second magnet portion and the first magnetic portion.

According to this aspect, click feeling is adjusted through the adjustment of the area of a region overlapping with the first magnetic portion.

(14) The lens barrel according to any one of (1) to (13), further comprising:
a movable range-restriction unit that restricts a movable range of the operation ring,
in which the magnet portions are provided in an angular range corresponding to the movable range of the operation ring.

According to this aspect, the movable range of the operation ring is restricted to a fixed angular range and the magnet portions are provided in an angular range corresponding to the movable range.

(15) A lens barrel comprising:
a stationary frame;
an operation ring that is radially fitted to an outer periphery of the stationary frame;
an end face-contact portion which is provided on the stationary frame and with which an end face of the operation ring is in contact;
a magnetic portion that is provided on the operation ring;
first magnet portions that are provided on the stationary frame at regular angular intervals in a circumferential direction and cause the operation ring to be click-stopped by a magnetic attractive force acting between the magnetic portion and the first magnet portion: and
second magnet portions that are provided on the end face-contact portion at regular angular intervals in the circumferential direction and attract the operation ring to the end face-contact portion by a magnetic attractive force acting between the magnetic portion and the second magnet portion to cause the operation ring to be in contact with the end face-contact portion.

According to this aspect, a magnetic attractive force acts between the magnetic portion provided on the operation ring and the first magnet portions provided on the stationary frame. As a result, in a case where the operation ring is rotated, click feeling is generated at regular angular intervals. The regular angular interval mentioned here includes an angular interval that is recognized as a substantially regular angular interval. Further, according to this aspect, a magnetic attractive force acts between the magnetic portion provided on the operation ring and the second magnet portions provided on the end face-contact portion. As a result, the operation ring is attracted to the end face-contact portion and is in contact with the end face-contact portion. Accordingly, since the backlash of the operation ring is removed, stable operation feeling without variations is obtained.

(16) The lens barrel according to (15),
in which the magnetic attractive force acting between the second magnet portion and the magnetic portion is set to be smaller than the magnetic attractive force acting between the first magnet portion and the magnetic portion.

According to this aspect, the magnetic attractive force acting between the second magnet portion and the magnetic portion is set to be smaller than the magnetic attractive force acting between the first magnet portion and the magnetic portion. Accordingly, since friction generated between the operation ring and the end face-contact portion can be reduced, a smoother rotating operation can be achieved. Since an object of the magnetic attractive force acting between the second magnet portion and the magnetic portion is to remove backlash, it is preferable that the magnetic attractive force is set in a range where the object can be achieved.

(17) The lens barrel according to (15) or (16),
in which the stationary frame and the end face-contact portion are formed of an integrally molded product in which the first magnet portions and the second magnet portions are insert-molded and which is made of a resin.

According to this aspect, the stationary frame and the end face-contact portion are formed of an integrally molded product made of a resin, and the first magnet portions and the second magnet portions are integrally molded by insert molding. Accordingly, the man-hours for assembly can be reduced.

(18) The lens barrel according to (15) or (16),
in which the stationary frame and the end face-contact portion are formed of an integrally molded product in which the first magnet portions and the second magnet portions are molded in two colors using bonded magnets and which is made of a resin.

According to this aspect, the stationary frame and the end face-contact portion are formed of an integrally molded product made of a resin. Further, the first magnet portions and the second magnet portions are integrally molded using bonded magnets by two-color molding. Accordingly, the man-hours for assembly can be reduced.

(19) The lens barrel according to any one of (15) to (18),
in which the operation ring is formed of an integrally molded product in which the magnetic portion is insert-molded and which is made of a resin.

According to this aspect, the magnetic portion is integrally molded with the operation ring by insert molding. Accordingly, the man-hours for assembly can be reduced.

(20) The lens barrel according to any one of (15) to (19),
in which the magnetic portion is formed of a ferromagnetic body.

According to this aspect, the magnetic portion is formed of a ferromagnetic body (for example, iron or the like).

(21) The lens barrel according to any one of (15) to (20),
in which the first magnet portions include one or more first first magnet portions that are provided at a first angular interval in the circumferential direction and one or more second first magnet portions that are provided at a second angular interval between the adjacent first first magnet portions, and
a magnetic attractive force acting between the first first magnet portion and the magnetic portion is set to be larger than a magnetic attractive force acting between the second first magnet portion and the magnetic portion.

According to this aspect, the first magnet portions include the first first magnet portions and the second first magnet portions and different click feeling is generated at the first first magnet portions and the second first magnet portions.

(22) The lens barrel according to (21),
in which clearance provided between the first first magnet portion and the magnetic portion is set to be narrower than clearance provided between the second first magnet portion and the magnetic portion, so that the magnetic attractive force acting between the first first magnet portion and the magnetic portion is set to be larger than the magnetic attractive force acting between the second first magnet portion and the magnetic portion.

According to this aspect, click feeling is adjusted through the adjustment of the clearance from the first magnetic portion.

(23) The lens barrel according to (21),
in which an area of a region where the first first magnet portion and the magnetic portion overlap with each other is set to be larger than an area of a region where the second first magnet portion and the magnetic portion overlap with each other, so that the magnetic attractive force acting between the first first magnet portion and the magnetic portion is set to be larger than the magnetic attractive force acting between the second first magnet portion and the magnetic portion.

According to this aspect, click feeling is adjusted through the adjustment of the area of a region overlapping with the first magnetic portion.

(24) The lens barrel according to any one of (15) to (23), further comprising:
a movable range-restriction unit that restricts a movable range of the operation ring,
in which the first magnet portions and the second magnet portions are provided in an angular range corresponding to the movable range of the operation ring.

According to this aspect, the movable range of the operation ring is restricted to a fixed angular range and the first magnet portions and the second magnet portions are provided in an angular range corresponding to the movable range.

According to the invention, stable operation feeling of an operation ring is obtained regardless of part accuracy.

DESCRIPTION OF THE PREFERRED EMBODIMENTS

Preferred embodiments of the invention will be described below with reference to the accompanying drawings.

First Embodiment

Here, a case where the invention is applied to a lens barrel for an interchangeable lens of a lens-interchangeable camera will be described by way of example.

[Configuration]

Figure 1:
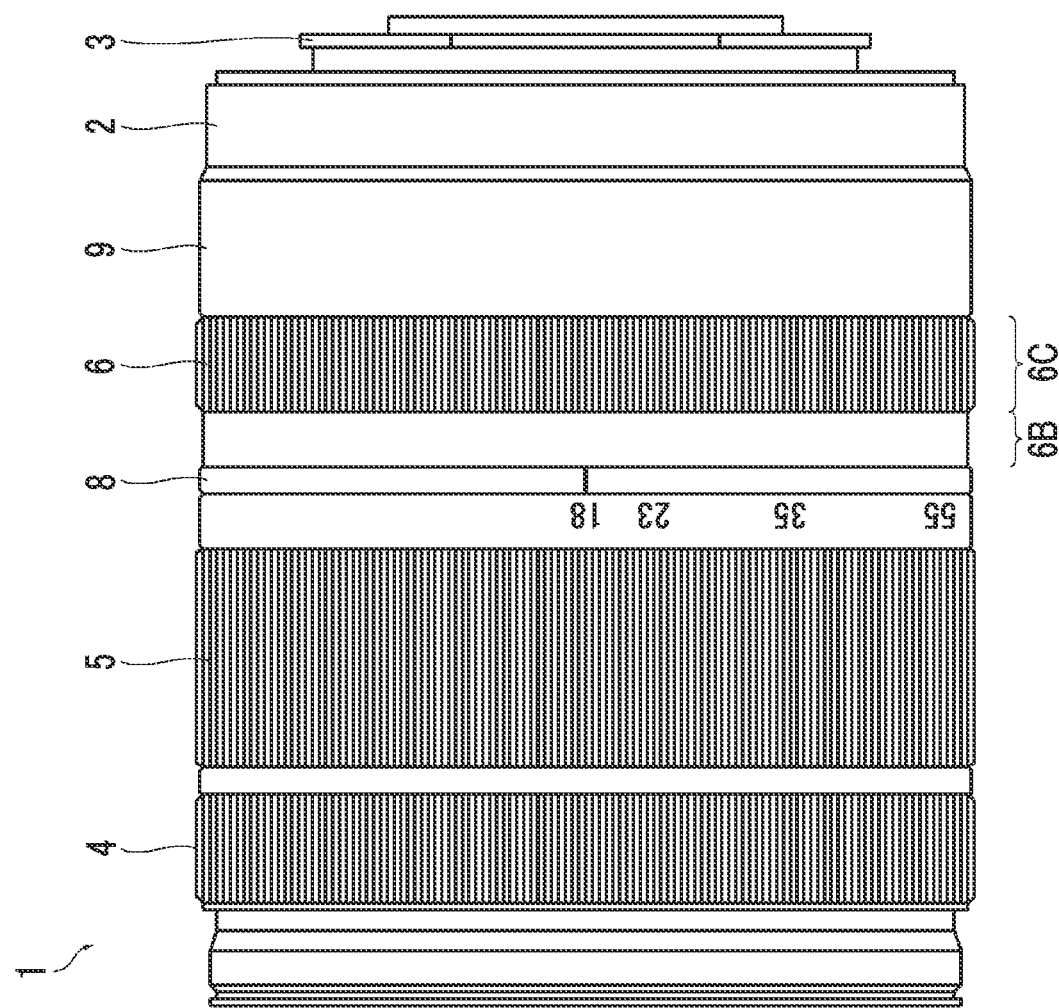
FIG. 1 is a plan view showing the appearance configuration of a lens barrel according to a first embodiment to which the invention is applied.

FIG. 1 is a plan view showing the appearance configuration of a lens barrel according to a first embodiment to which the invention is applied.

The lens barrel 1 shown in FIG. 1 is a lens barrel for a zoom lens. The lens barrel 1 includes a mount 3 at the proximal end portion of a lens barrel body 2 thereof. The lens barrel 1 is attachably and detachably mounted on a camera body (not shown) through the mount 3. Further, the lens barrel 1 includes a focus ring 4, a zoom ring 5, and a stop ring 6 on the outer periphery of the lens barrel body 2 thereof. The focus ring 4 of the lens barrel 1 is operated to rotate, so that a focus is adjusted. Further, the zoom ring 5 is operated to rotate, so that a focal length can be changed. Furthermore, the stop ring 6 is operated to rotate, so that an F number is switched.

The focus ring 4 can be operated to rotate endlessly and steplessly in a circumferential direction. The zoom ring 5 can be operated to rotate steplessly in a fixed angular range in the circumferential direction. The stop ring 6 can be operated to rotate endlessly and stepwise in the circumferential direction. That is, the stop ring 6 is provided with a click mechanism and can be operated to rotate stepwise at regular angular intervals. Whenever the stop ring 6 is operated to rotate by, for example, one click, an F number is switched by ⅓ steps. The stop ring 6 is an example of an operation ring.

Figure 2:
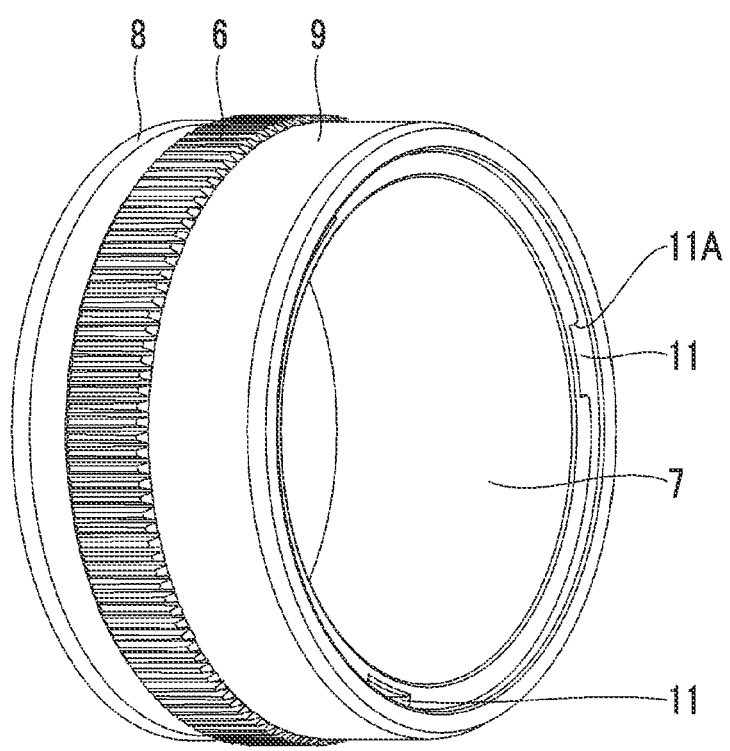
FIG. 2 is a perspective view showing the schematic configuration of a mounting portion of a stop ring.
Figure 3:
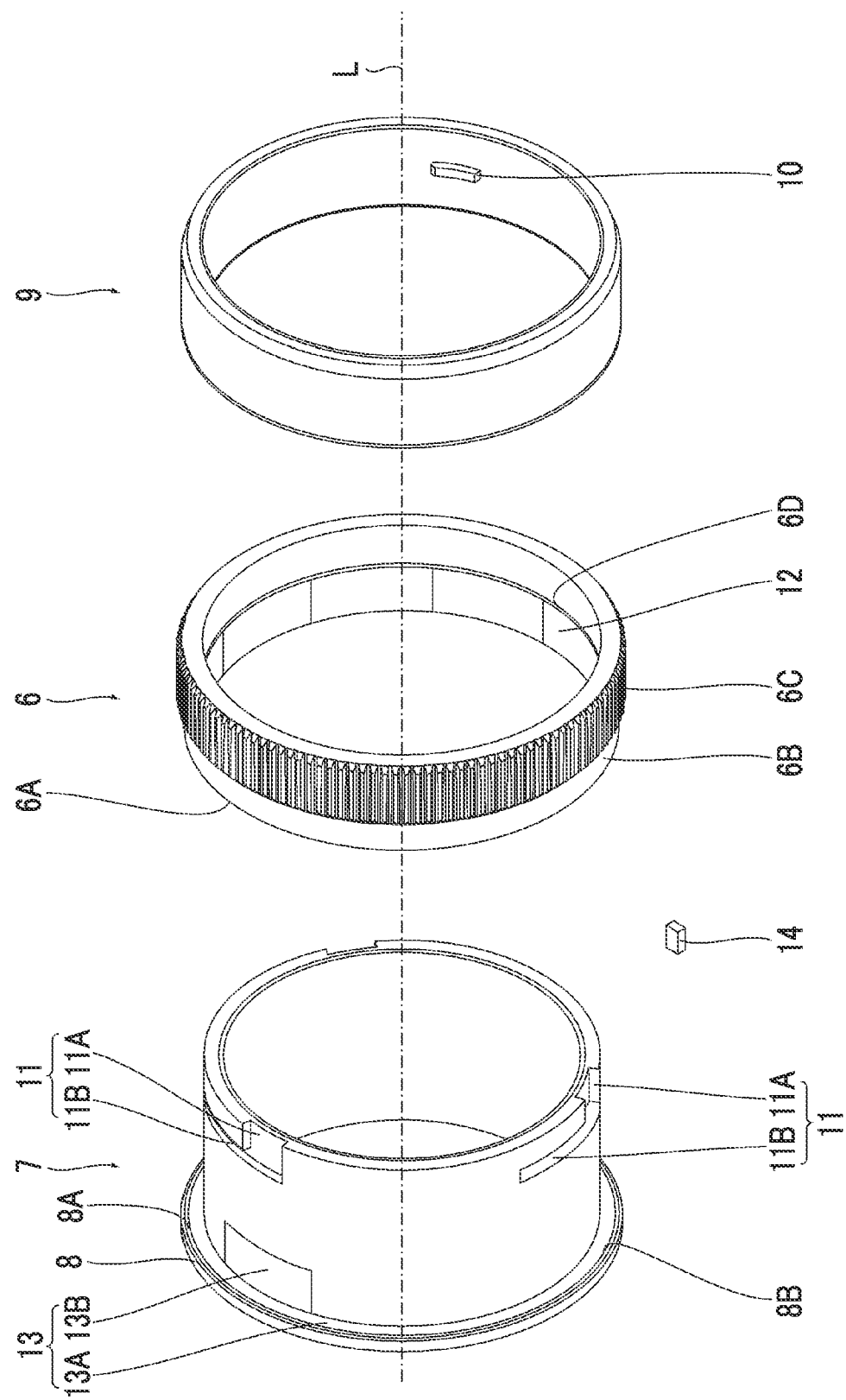
FIG. 3 is an exploded perspective view showing the schematic configuration of the mounting portion of the stop ring.
Figure 4:
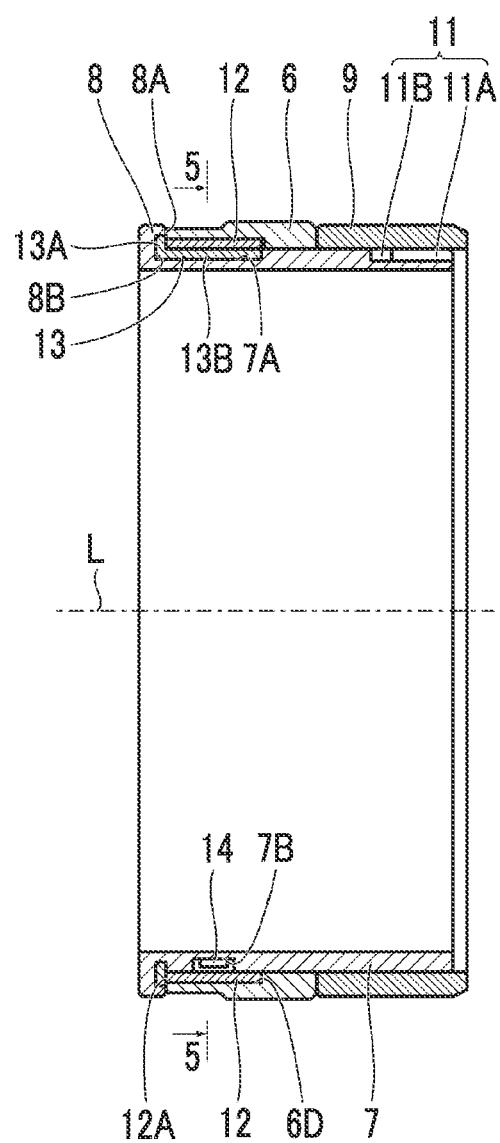
FIG. 4 is a side cross-sectional view showing the schematic configuration of the mounting portion of the stop ring.
Figure 5:
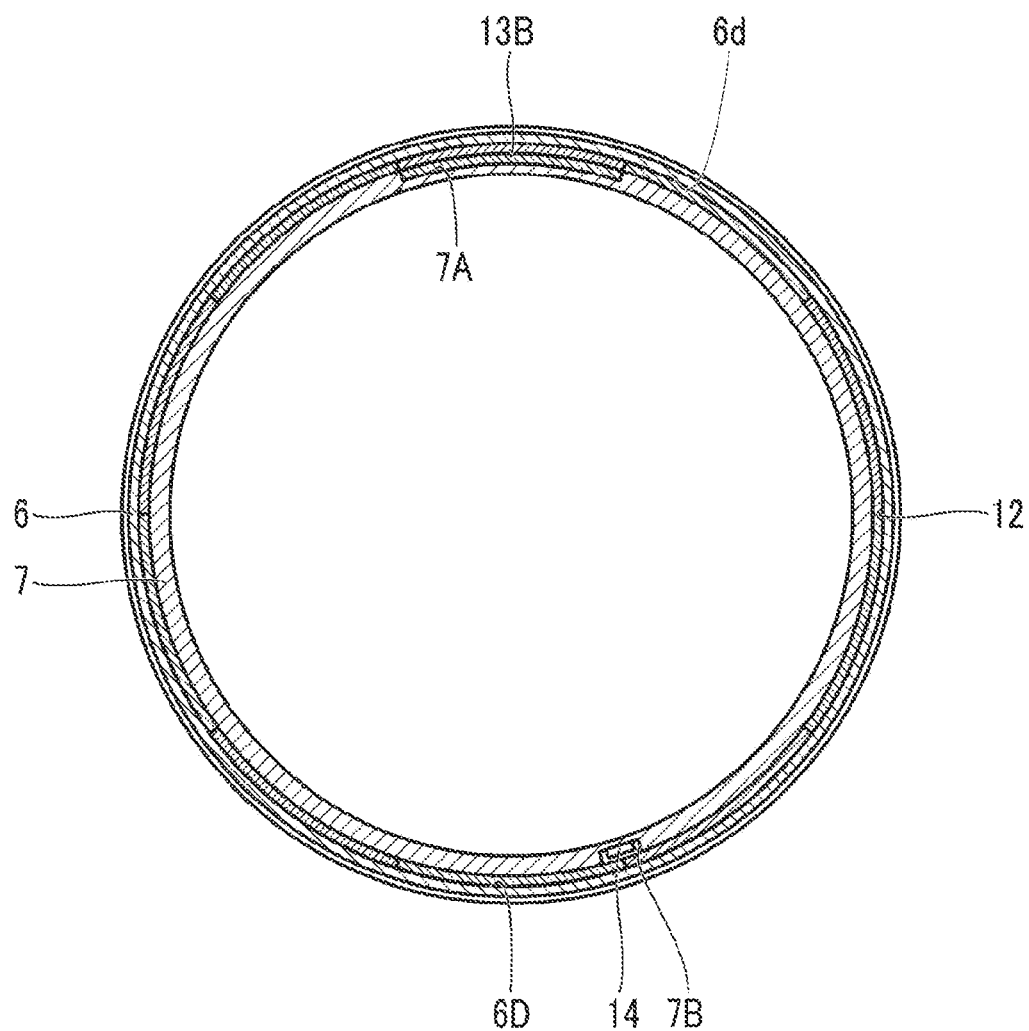
FIG. 5 is a cross-sectional view taken along line 5-5 of FIG. 4.

FIG. 2 is a perspective view showing the schematic configuration of a mounting portion of the stop ring. FIG. 3 is an exploded perspective view showing the schematic configuration of the mounting portion of the stop ring. FIG. 4 is a side cross-sectional view showing the schematic configuration of the mounting portion of the stop ring. FIG. 5 is a cross-sectional view taken along line 5-5 of FIG. 4.

As shown in FIGS. 2 to 5, the stop ring 6 is radially fitted to the outer periphery of a stationary frame 7 and is mounted on the lens barrel body 2. The stationary frame 7 is a member forming the lens barrel body 2. The stationary frame 7 is a member to be fixed to the mount 3.

The stationary frame 7 has a cylindrical shape and includes a flange 8 on the outer periphery thereof. A rear (mount-side) end face 8A of the flange 8 is formed as a surface orthogonal to an optical axis L. A front end face 6A of the stop ring 6 is in contact with the end face 8A of the flange 8. Accordingly, the forward movement of the stop ring 6 is restricted. The flange 8 is an example of an end face-contact portion.

A pressing ring 9 is mounted on the stationary frame 7 together with the stop ring 6. The pressing ring 9 has a cylindrical shape and is mounted on the stationary frame 7, so that the pressing ring 9 restricts the movement of the stop ring 6 in the direction of the optical axis between the flange 8 of the stationary frame 7 and itself.

The pressing ring 9 is mounted on the stationary frame 7 by a bayonet structure. As shown in FIG. 3, the inner peripheral portion of the pressing ring 9 is provided with locking claw portions 10 at three positions in the circumferential direction. On the other hand, the outer peripheral portion of the stationary frame 7 is provided with locking groove portions 11 at three positions in the circumferential direction. The locking groove portion 11 includes an inlet portion 11A that extends in the direction of the optical axis, and a locking portion 11B that extends in the circumferential direction. One end of the inlet portion 11A opens to a rear (mount-side) end face of the stationary frame 7. One end of the locking portion 11B communicates with the inlet portion 11A. The locking claw portion 10 has a height that allows the locking claw portion 10 to be fitted to the locking groove portion 11, and the lateral width (the width in the circumferential direction) of the locking claw portion 10 is substantially the same as the width (the width in the circumferential direction) of the inlet portion 11A of the locking groove portion 11. Further, the thickness (the width in the direction of the optical axis) of the locking claw portion 10 is substantially the same as the width (the width in the direction of the optical axis) of the locking portion 11B of the locking groove portion 11. In a case where the pressing ring 9 is to be mounted on the stationary frame 7, first, the positions of the locking claw portions 10 of the pressing ring 9 are aligned with the positions of the inlet portions 11A of the locking groove portions 11 of the stationary frame 7. After that, the pressing ring 9 is caused to slide in the direction of the optical axis so that the locking claw portions 10 are fitted to the inlet portions 11A of the locking groove portions 11. Furthermore, the pressing ring 9 is rotated in the circumferential direction, so that the locking claw portions 10 are fitted to the locking portions 11B. Accordingly, the movement of the pressing ring 9 in the direction of the optical axis is restricted, and the pressing ring 9 is mounted on the stationary frame 7.

The stop ring 6 has a cylindrical shape, and includes a smooth portion 6B and a knurled portion 6C on the outer peripheral portion thereof. The knurled portion 6C functions to prevent slip. The stop ring 6 has a shape that allows the stop ring 6 to be fitted between the flange 8 of the stationary frame 7 and the pressing ring 9. Accordingly, in a case where the pressing ring 9 is mounted on the stationary frame 7 after the stop ring 6 is mounted on the stationary frame 7, the stop ring 6 is sandwiched between the pressing ring 9 and the flange 8 and is rotatably held in a state where the movement of the stop ring 6 in the direction of the optical axis is restricted.

As described above, the stop ring 6 is provided with the click mechanism. The click mechanism includes a multipolar magnet 12 that is provided on the stop ring 6 and a sheet metal part 13 that is provided on the stationary frame 7.

The multipolar magnet 12 has the shape of a ring, and is integrally mounted on the inner peripheral portion of the stop ring 6. The inner peripheral portion of the stop ring 6 is provided with a ring-shaped recessed portion 6D as a mounting portion for the ring-shaped multipolar magnet 12. The recessed portion 6D is formed to extend from the front end face 6A of the stop ring 6 serving as a starting point and to have a constant width in the direction of the optical axis. Accordingly, the recessed portion 6D opens to the front end face 6A of the stop ring 6. Further, the recessed portion 6D is formed to have a constant depth.

Figure 6:
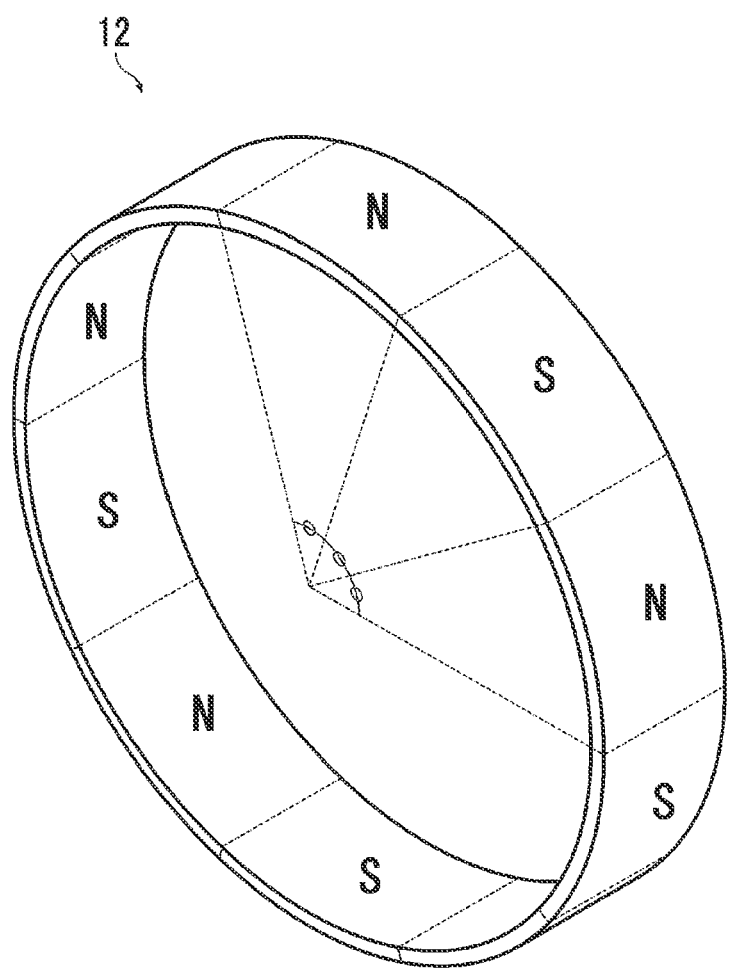
FIG. 6 is a perspective view showing the schematic configuration of a multipolar magnet.

FIG. 6 is a perspective view showing the schematic configuration of the multipolar magnet. In FIG. 6, reference character S denotes an S pole of the magnet and reference character N denotes an N pole of the magnet.

The multipolar magnet 12 has configuration where the multipolar magnet 12 is magnetized to have multiple poles at regular angular intervals in the circumferential direction. Specifically, the multipolar magnet 12 has configuration where S poles and N poles are arranged alternately at regular angular intervals in the circumferential direction as shown in FIG. 6. Each of magnetic pole portions of the multipolar magnet 12 corresponding to S poles and N poles is an example of a magnet portion. The fixed angular interval mentioned here includes a range that is recognized as a substantially regular angular interval.

The multipolar magnet 12 is fitted to the recessed portion 6D of the stop ring 6 and is integrally mounted on the inner peripheral portion of the stop ring 6. A front end face 12A of the multipolar magnet 12 mounted on the stop ring 6 is positioned on substantially the same plane as the front end face 6A of the stop ring 6.

The sheet metal part 13 is formed of an integrally molded product made of a magnetic material (a metal material having magnetically useful properties), and includes a ring-shaped body portion 13A and a plate-like protrusion portion 13B that extends perpendicularly from the body portion 13A. In this embodiment, the sheet metal part 13 is made of iron, which is a ferromagnetic body, and the body portion 13A and the protrusion portion 13B are integrally formed by sheet metal working, so that the sheet metal part 13 is formed as an integrally molded product.

The body portion 13A is radially fitted to the outer periphery of the stationary frame 7, so that the sheet metal part 13 is mounted on the stationary frame 7. The body portion 13A of the sheet metal part 13 mounted on the stationary frame 7 is disposed on the rear end face portion of the flange 8 and the protrusion portion 13B is disposed on the outer peripheral surface.

The rear end face 8A of the flange 8 is provided with a recessed portion 8B to which the body portion 13A of the sheet metal part 13 is to be fitted. The body portion 13A is fitted to the recessed portion 8B, so that the rear end face of the body portion 13A is positioned on the same place as the rear end face 8A of the flange 8. The body portion 13A is an example of a second magnetic portion.

Further, the outer periphery of the stationary frame 7 is provided with a recessed portion 7A to which the protrusion portion 13B of the sheet metal part 13 is to be fitted. Here, the protrusion portion 13B has the shape of an arcuate plate along the outer periphery of the stationary frame 7 and is fitted to the recessed portion 7A, so that the outer peripheral surface of the protrusion portion 13B is positioned on the same plane as the outer peripheral surface of the stationary frame 7. That is, the outer peripheral surface of the protrusion portion 13B has the same curvature as the outer peripheral surface of the stationary frame 7.

The protrusion portion 13B has substantially the same width as one magnetic pole (an S pole or an N pole) of the multipolar magnet 12 in the circumferential direction. Further, the protrusion portion 13B has a length substantially the same as the length of the multipolar magnet 12 in the direction of the optical axis. That is, the protrusion portion 13B has a shape corresponding to the shape of the inner peripheral surface of one magnetic pole portion of the multipolar magnet 12. The protrusion portion 13B is an example of a first magnetic portion.

Figure 7:
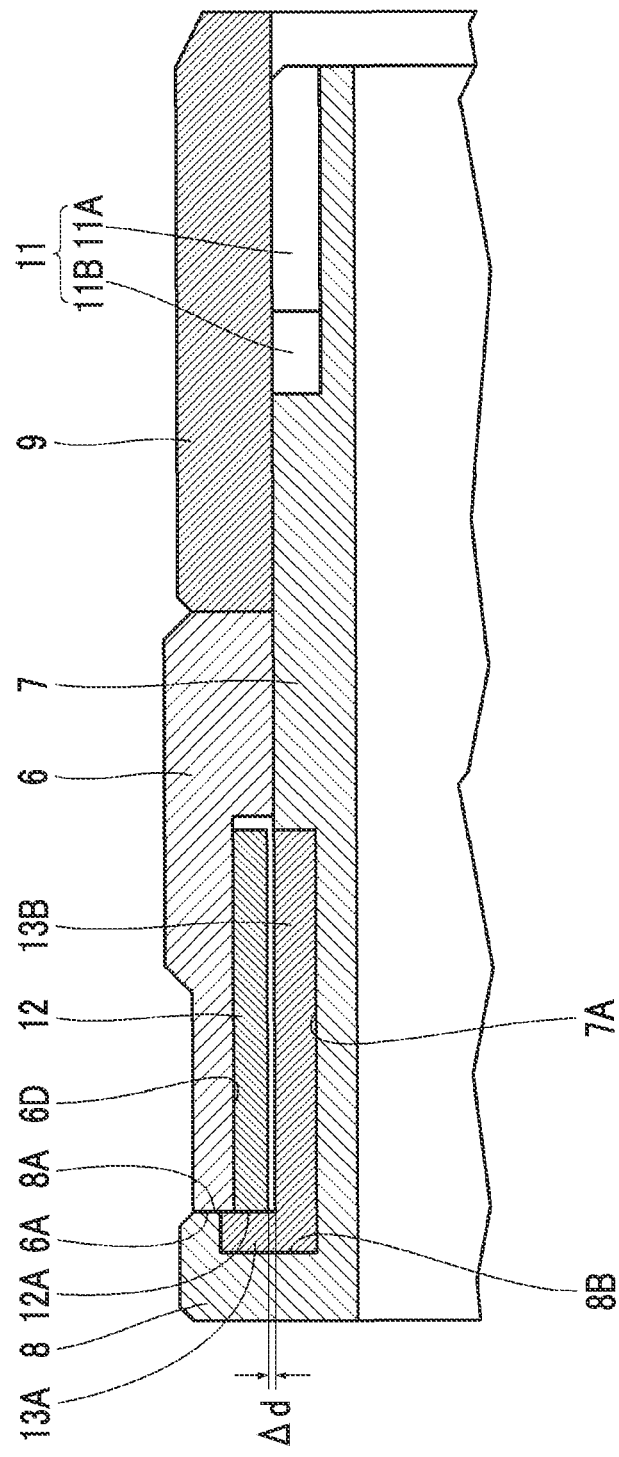
FIG. 7 is an enlarged view of a part of FIG. 4.

FIG. 7 is an enlarged view of a part of FIG. 4, and shows a mounting relationship between the multipolar magnet 12 and the sheet metal part 13.

In a case where the stop ring 6 is mounted on the stationary frame 7, the protrusion portion 13B of the sheet metal part 13 is disposed so as to face the inner peripheral surface of the multipolar magnet 12 with constant clearance Δd therebetween as shown in FIG. 7. As a result, a magnetic attractive force acts between the protrusion portion 13B and the multipolar magnet 12. This force is maximum at the center position of each magnetic pole in the circumferential direction, and is reduced as a distance from the center is increased. That is, this force is minimum at a boundary between an S pole and an N pole. As a result, in a case where the stop ring 6 is rotated, a magnetic attractive force acting between the protrusion portion 13B and the multipolar magnet 12 is periodically changed and click feeling is generated at regular angular intervals. Further, the stop ring 6 is click-stopped at regular angular intervals. That is, the stop ring 6 is click-stopped at the center position of each magnetic pole in the circumferential direction.

In a case where the stop ring 6 is mounted on the stationary frame 7, the body portion 13A of the sheet metal part 13 is disposed so as to face the front end face 12A of the multipolar magnet 12 as shown in FIG. 7. The stop ring 6 is attracted toward the flange 8 by a magnetic attractive force acting between the multipolar magnet 12 and the body portion 13A, so that the front end face 6A is in press contact with the rear end face 8A of the flange 8 (including the body portion 13A of the sheet metal part 13). Since this force always acts, the backlash of the stop ring 6 against the flange 8 is always removed. As a result, since backlash is removed, a stable rotating operation can be always achieved.

Here, a magnetic attractive force acting between the multipolar magnet 12 and the body portion 13A is set to a force smaller than a magnetic attractive force acting between the multipolar magnet 12 and the protrusion portion 13B. Specifically, a magnetic attractive force acting between the multipolar magnet 12 and the body portion 13A is set to a force enough to remove backlash. Accordingly, since friction acting between the stop ring 6 and the flange 8 can be reduced, a smoother rotating operation can be achieved.

A magnetic attractive force acting between the multipolar magnet 12 and the protrusion portion 13B is adjusted according to the clearance Δd formed between the multipolar magnet 12 and the protrusion portion 13B. In a case where the clearance Δd is increased, a magnetic attractive force acting between the multipolar magnet 12 and the body portion 13A of the sheet metal part 13 is reduced. On the other hand, in a case where the clearance Δd is reduced, a magnetic attractive force acting between the multipolar magnet 12 and the body portion 13A of the sheet metal part 13 is increased. The clearance Δd is set to clearance Δd that allows moderate click feeling to be generated.

The stop ring 6 is provided with a rotation detection unit that detects the rotation of the stop ring 6 corresponding to each click. The rotation detection unit includes the multipolar magnet 12 that is provided on the stop ring 6 and a magneto resistive sensor (MR sensor) 14 that is provided on the stationary frame 7.

The MR sensor 14 detects the change of magnetic flux caused by the rotation of the stop ring 6, and outputs a signal (pulse signal) in a case where the magnetic flux exceeds a threshold value. The stationary frame 7 is provided with a sensor mounting portion 7B on which the MR sensor 14 is to be mounted. As shown in FIG. 4, the sensor mounting portion 7B is provided on the outer peripheral surface of the stationary frame 7 as a recessed portion that can house the MR sensor 14. A position where the sensor mounting portion 7B is to be provided is a position where the multipolar magnet 12 is to be positioned in a case where the stop ring 6 is mounted on the stationary frame 7.

A position in the circumferential direction where the MR sensor 14 is to be mounted is a position corresponding to a boundary between an S pole and an N pole of the multipolar magnet 12 in a case where the stop ring 6 is click-stopped. Accordingly, whenever the stop ring 6 is click-stopped, a pulse signal is output from the MR sensor 14 (whenever the center of each magnetic pole passes by the center of the protrusion portion 13B, a pulse signal is output.).

The rotation detection unit detects the rotation of the stop ring 6 corresponding to each click by detecting a pulse signal output from the MR sensor 14.

[Action]

A magnetic attractive force acts on the stop ring 6, which is assembled to the lens barrel body 2, between the ring-shaped multipolar magnet 12 provided on the inner peripheral portion of the stop ring 6 and the sheet metal part 13 provided on the stationary frame 7. This magnetic attractive force is divided into a magnetic attractive force acting between the body portion 13A of the sheet metal part 13 and the multipolar magnet 12 and a magnetic attractive force acting between the protrusion portion 13B of the sheet metal part 13 and the multipolar magnet 12.

A magnetic attractive force acting between the body portion 13A of the sheet metal part 13 and the multipolar magnet 12 provides a function to always attract the stop ring 6 toward the flange 8. As a result, the front end face 6A of the stop ring 6 is always in contact with the rear end face 8A of the flange 8. That is, backlash is removed. Accordingly, since backlash accompanying the mounting of the stop ring 6 is removed, a stable rotating operation can be always achieved.

On the other hand, a magnetic attractive force acting between the protrusion portion 13B of the sheet metal part 13 and the multipolar magnet 12 provides a function to cause the stop ring 6 to be click-stopped at regular angular intervals.

Figure 8:
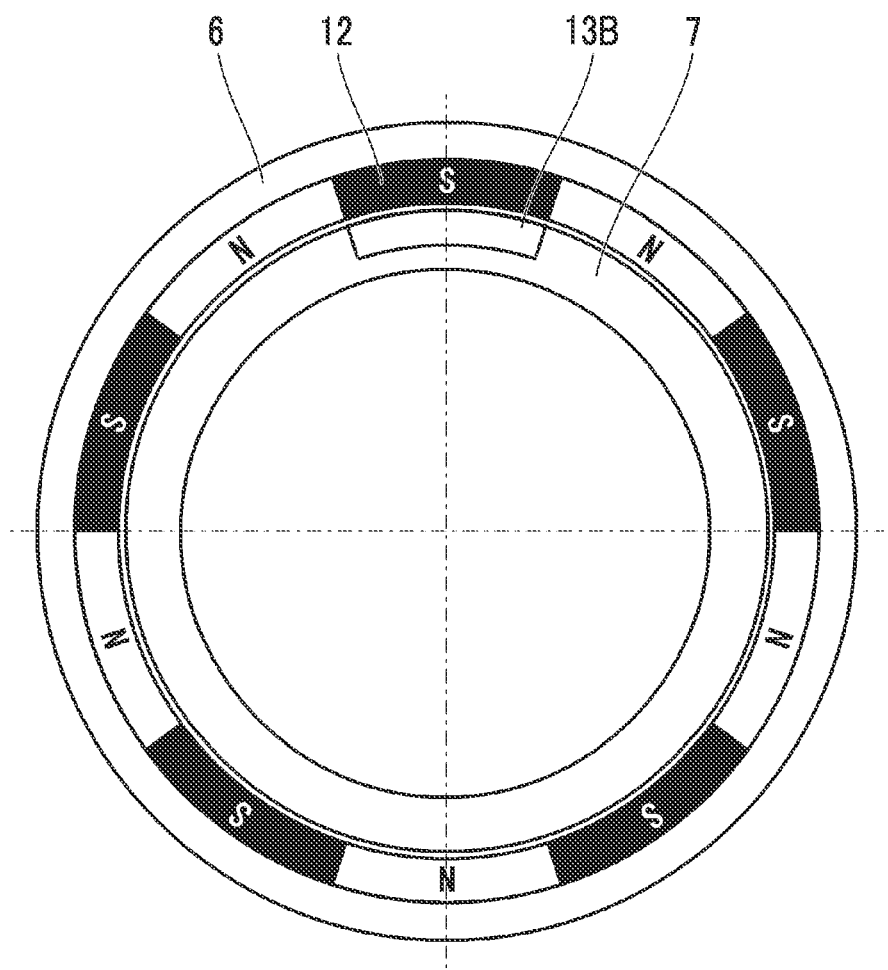
FIG. 8 is a diagram illustrating the function of a click-stop caused by a magnetic attractive force.
Figure 9:
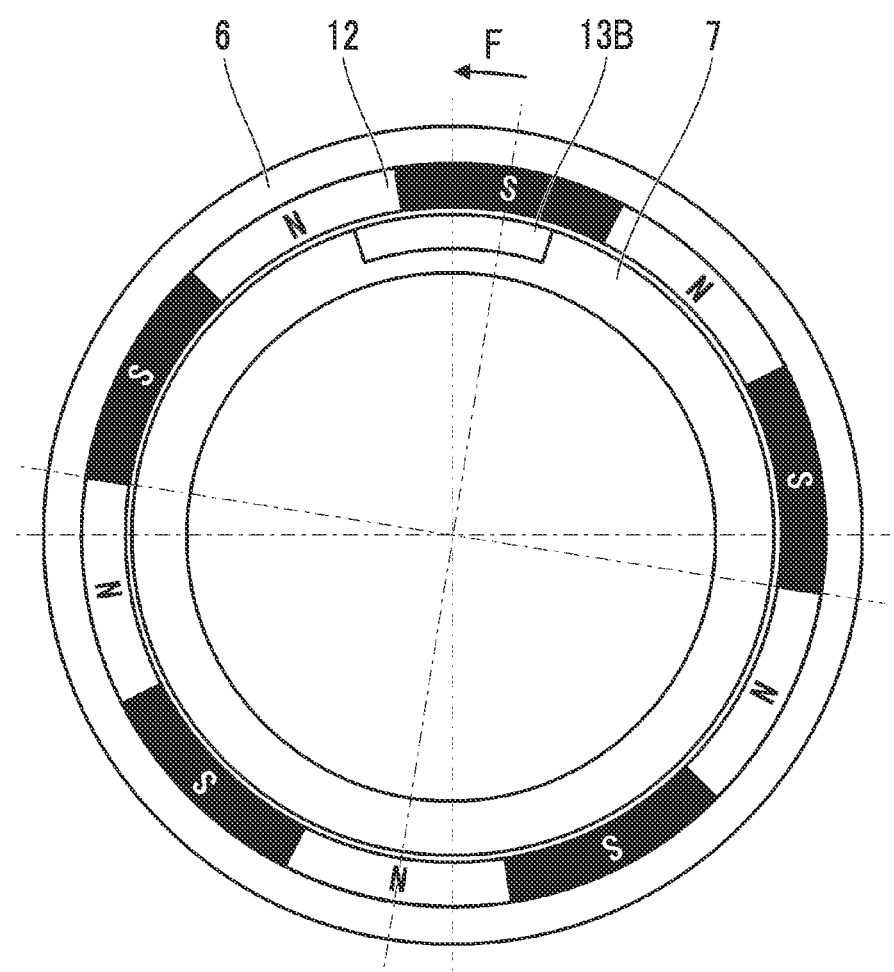
FIG. 9 is a diagram illustrating the function of the click-stop caused by a magnetic attractive force.

FIGS. 8 and 9 are diagrams illustrating the function of the click-stop caused by a magnetic attractive force. FIGS. 8 and 9 are diagrams schematically showing a relationship between the stop ring 6, which is click-stopped by a magnetic attractive force, and the stationary frame 7.

FIG. 8 shows a case where the center of one magnetic pole (an S pole in FIG. 8) of the multipolar magnet 12 magnetized to have multiple poles coincides with the center of the center of the protrusion portion 13B. The stop ring 6 is magnetically stable at a point where the center of each magnetic pole coincides with the center of the protrusion portion 13B. That is, a magnetic attractive force acting between the protrusion portion 13B and the multipolar magnet 12 is balanced. FIG. 9 shows a case where the center (magnetically stable point) of the magnetic pole is shifted from the center of the protrusion portion 13B. In this case, a force F returning the stop ring 6 to a magnetically stable state acts on the stop ring 6. In a case where the stop ring 6 is rotated, the center (magnetically stable point) of each magnetic pole passes by the protrusion portion 13B at regular angular intervals. Before and after the center (magnetically stable point) of each magnetic pole passes by the protrusion portion 13B, the force F returning the stop ring 6 to a magnetically stable state acts on the stop ring 6. This force is transmitted to an operator as click feeling. Further, in a case where a force for rotating the stop ring 6 is cancelled, the stop ring 6 is automatically stopped at a magnetically stable point. That is, the stop ring 6 is click-stopped.

According to the lens barrel 1 of this embodiment, as described above, click feeling can be generated for the rotation of the stop ring 6 by the action of the multipolar magnet 12 provided on the stop ring 6 and the sheet metal part 13 provided on the stationary frame 7. Further, since the backlash of the stop ring 6 can be removed by a magnetic attractive force acting between the multipolar magnet 12 and the body portion 13A of the sheet metal part 13, stable operation feeling can be given. Furthermore, since backlash can be removed, machining accuracy required for each part can be relaxed. Moreover, even the adjustment of click feeling can be stabilized only by the management of clearance. Further, since the management of radial fitting is easy even in regard to the management of clearance, stable production without variations in products can be achieved.

Second Embodiment

[Configuration]

Figure 10:
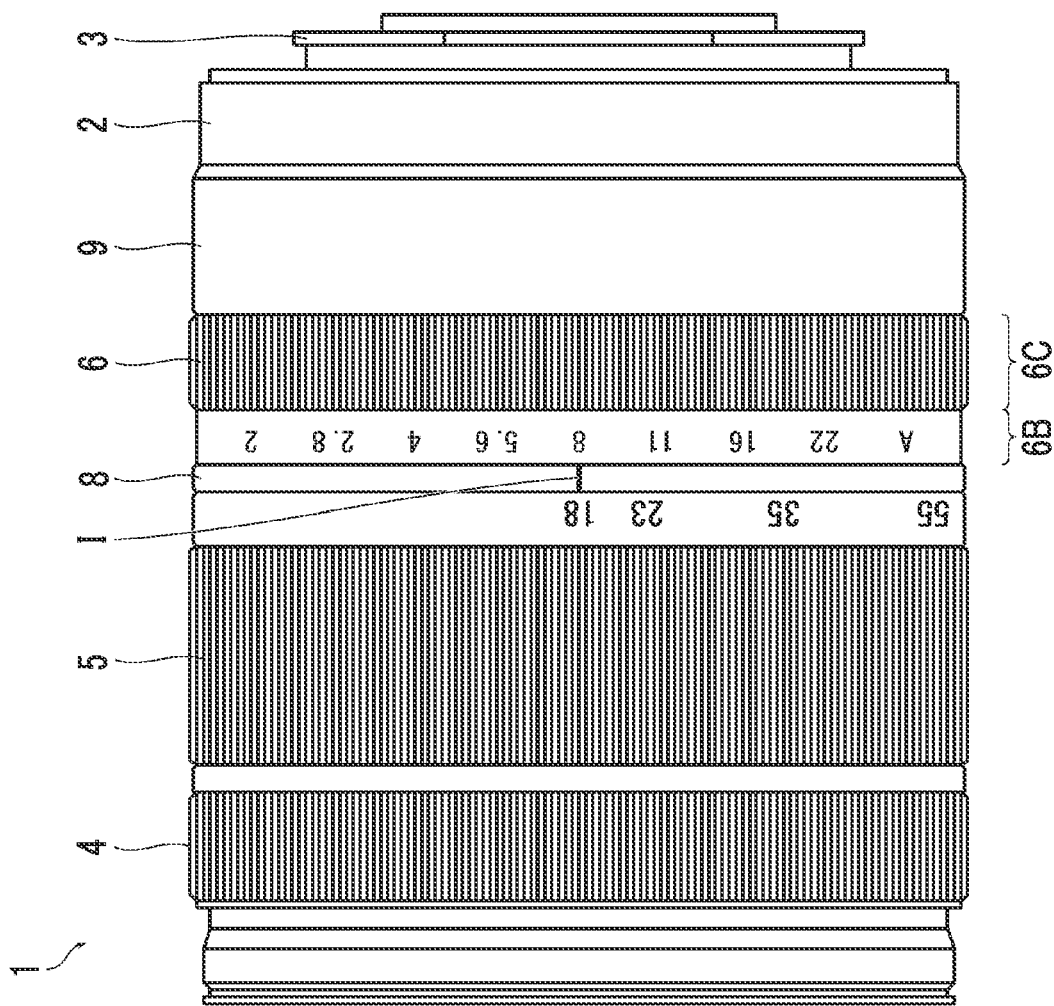
FIG. 10 is a plan view showing the appearance configuration of a lens barrel according to a second embodiment to which the invention is applied.

FIG. 10 is a plan view showing the appearance configuration of a lens barrel according to a second embodiment to which the invention is applied.

F numbers, which can be set by the lens barrel 1, are printed (or engraved) on the outer peripheral surface (smooth portion 6B) of a stop ring 6 of the lens barrel 1 according to this embodiment. In a case where an F number printed on the stop ring 6 of the lens barrel 1 is aligned with an index I printed (or engraved) on the outer peripheral surface of a lens barrel body 2 (the outer peripheral surface of a flange 8 of a stationary frame 7), the F number is set.

FIG. 10 shows a case where a settable F number is F2.8, F4, F5.6, F8, F11, F16, and F22. In this case, the respective numerical values of "2.8", "4", "5.6", "8", "11", "16", and "22" are printed on the outer peripheral surface of the stop ring 6. "A" denotes automatic. "A" is aligned with the index I in modes where an F number is automatically set (an automatic imaging mode, a shutter speed mode, and the like). Automatic (A) is set to a position next to F22(22).

The stop ring 6 is click-stopped at the position of each F number including automatic (A). An interval at which the stop ring 6 is click-stopped is set to a regular angular interval.

Further, since the movable range of the stop ring 6 is restricted, the stop ring 6 can be operated to rotate in a fixed angular range. Specifically, the stop ring 6 can be operated to rotate between a position where the index I is aligned with "2.8" (F2.8) and a position where the index I is aligned with "A" (automatic). The movable range of the stop ring 6 is restricted by a movable range-restriction unit.

Figure 11:
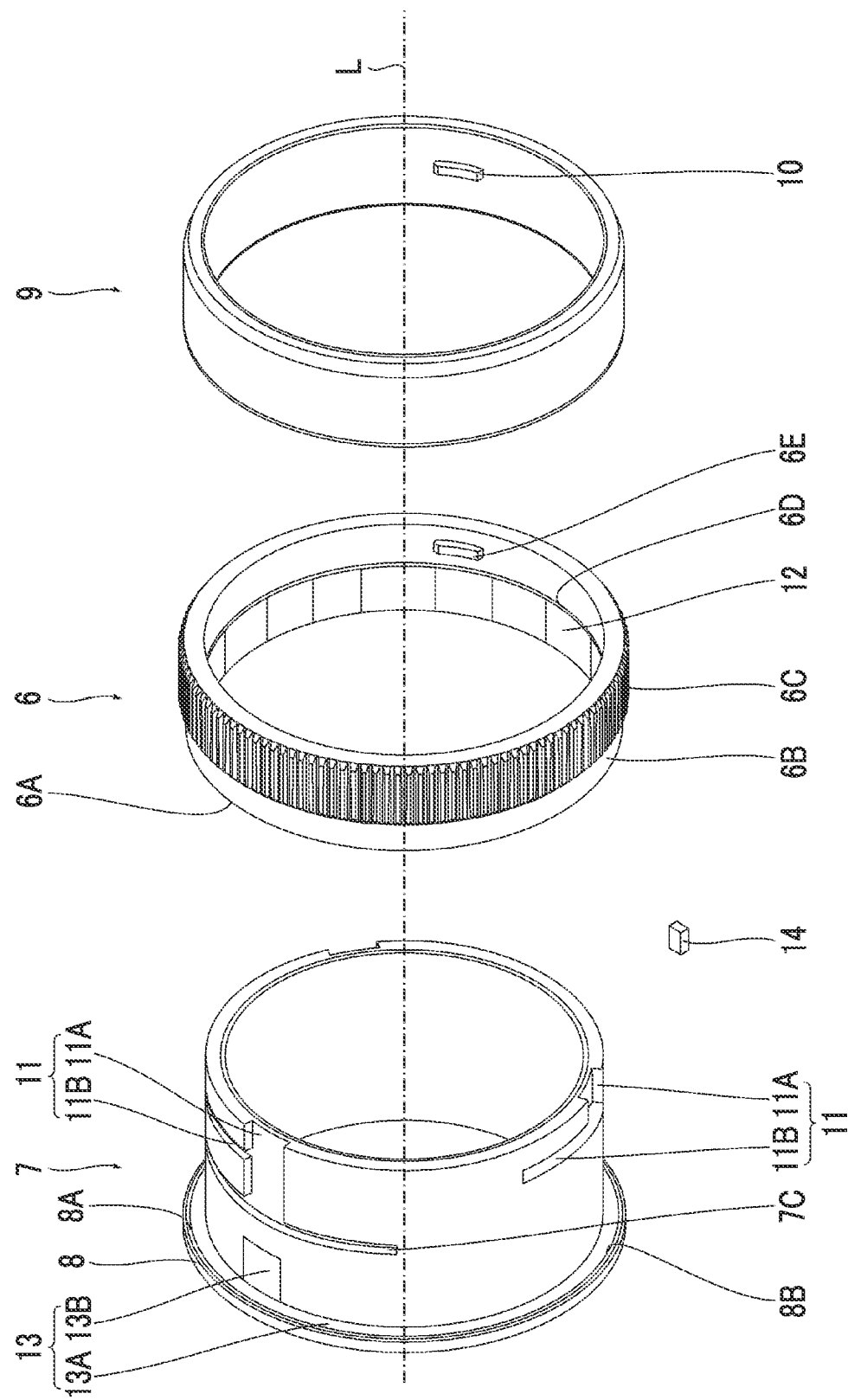
FIG. 11 is an exploded perspective view showing the schematic configuration of a mounting portion of a stop ring.
Figure 12:
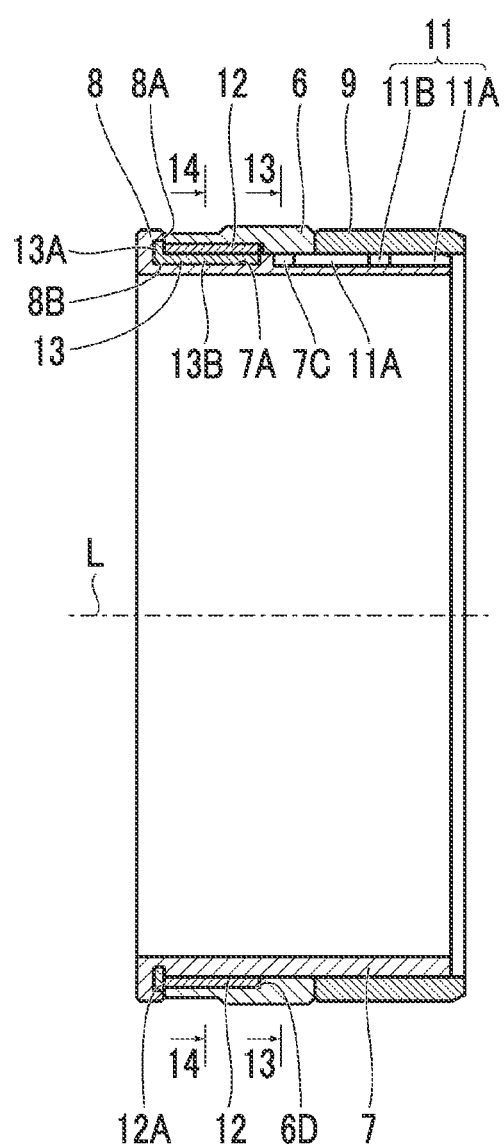
FIG. 12 is a side cross-sectional view of the mounting portion of the stop ring.
Figure 13:
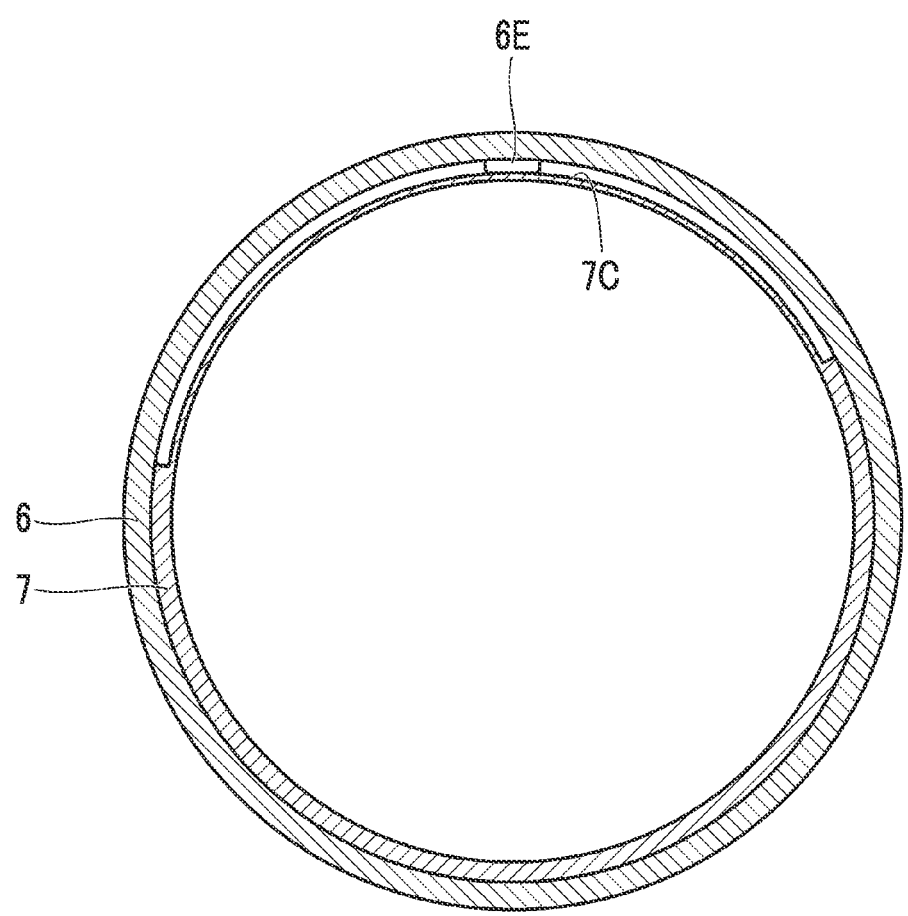
FIG. 13 is a cross-sectional view taken along line 13-13 of FIG. 12.

FIG. 11 is an exploded perspective view showing the schematic configuration of a mounting portion of the stop ring. FIG. 12 is a side cross-sectional view of the mounting portion of the stop ring. FIG. 13 is a cross-sectional view taken along line 13-13 of FIG. 12.

The movable range-restriction unit includes a movable range-restriction groove 7C that is provided on the stationary frame 7 and a movable range-restriction claw 6E provided on the stop ring 6.

The movable range-restriction groove 7C is provided on the outer peripheral surface of the stationary frame 7 as a groove that extends in a circumferential direction. The movable range-restriction groove 7C is provided in a predetermined angular range. The movable range-restriction groove 7C communicates with one of locking groove portions 11 that are provided at three positions on the outer peripheral surface of the stationary frame 7. An inlet portion 11A of one of the locking groove portions 11 provided at three positions extends up to the movable range-restriction groove 7C and communicates with the movable range-restriction groove 7C.

The movable range-restriction claw 6E is provided on the inner peripheral surface of the stop ring 6 as a protruding portion that can be fitted to the movable range-restriction groove 7C. More specifically, the movable range-restriction claw 6E has a height that allows the movable range-restriction claw 6E to be fitted to the movable range-restriction groove 7C, and the thickness (the width in the direction of an optical axis) of the movable range-restriction claw 6E is substantially the same as the width (the width in the direction of the optical axis) of the movable range-restriction groove 7C. Further, the lateral width (the width in the circumferential direction) of the movable range-restriction claw 6E is substantially the same as the width (the width in the circumferential direction) of the inlet portion 11A of the locking groove portion 11.

In a case where the stop ring 6 is to be mounted on the stationary frame 7, first, the position of the movable range-restriction claw 6E provided on the stop ring 6 and the position of the inlet portion 11A of the locking groove portion 11 (the locking groove portion 11 communicating with the movable range-restriction groove 7C) provided on the stationary frame 7 are aligned with each other. After that, the stop ring 6 is caused to slide in the direction of the optical axis to fit the movable range-restriction claw 6E to the movable range-restriction groove 7C. In a case where the movable range-restriction claw 6E is fitted to the movable range-restriction groove 7C, the movable range of the stop ring 6 is restricted. Accordingly, the stop ring 6 is supported to be capable of being operated to rotate in a fixed angular range. That is, the stop ring 6 is supported to be capable of being operated to rotate in a range until the movable range-restriction claw 6E comes into contact with an end portion of the movable range-restriction groove 7C. In a case where the movable range-restriction claw 6E is in contact with one end portion of the movable range-restriction groove 7C, "2.8" (F2.8) of the stop ring 6 is positioned at the position of the index I. Further, in a case where the movable range-restriction claw 6E is in contact with the other end portion of the movable range-restriction groove 7C, "A" (automatic) is positioned at the position of the index I.

In the lens barrel 1 according to this embodiment, a multipolar magnet 12 is provided in a range corresponding to the movable range of the stop ring 6.

Figure 14:
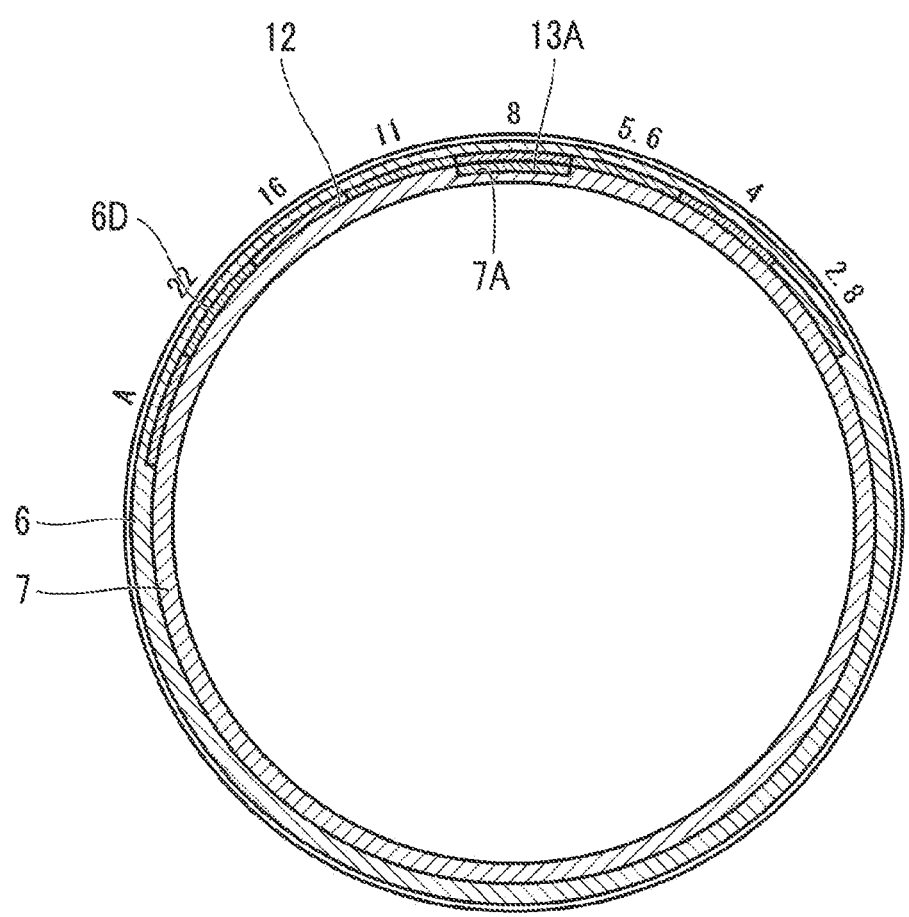
FIG. 14 is a cross-sectional view taken along line 14-14 of FIG. 12.

FIG. 14 is a cross-sectional view taken along line 14-14 of FIG. 12. As shown in FIG. 14, the arcuate multipolar magnet 12 is mounted on the stop ring 6. An arcuate recessed portion 6D is provided on the inner peripheral portion of the stop ring 6 as a mounting portion for the multipolar magnet 12.

The multipolar magnet 12 is magnetized at the same angular interval as the setting interval of an F number. For example, in a case where the setting interval of an F number is 18°, the multipolar magnet 12 is magnetized so that S poles and N poles are alternately switched at an interval of 18°.

A protrusion portion 13B of a sheet metal part 13 has configuration corresponding to one magnetic pole (an S pole or an N pole) of the multipolar magnet 12. That is, the protrusion portion 13B has the same width as one magnetic pole in the circumferential direction, and has the same length as one magnetic pole in the direction of the optical axis.

[Action]

In the lens barrel 1, the movable range of the stop ring 6 is restricted to a fixed angular range by the movable range-restriction unit (the movable range-restriction groove 7C and the movable range-restriction claw 6E). The stop ring 6 is held to be capable of being click-stopped at an interval of a fixed angle in the movable range.

Figure 15:
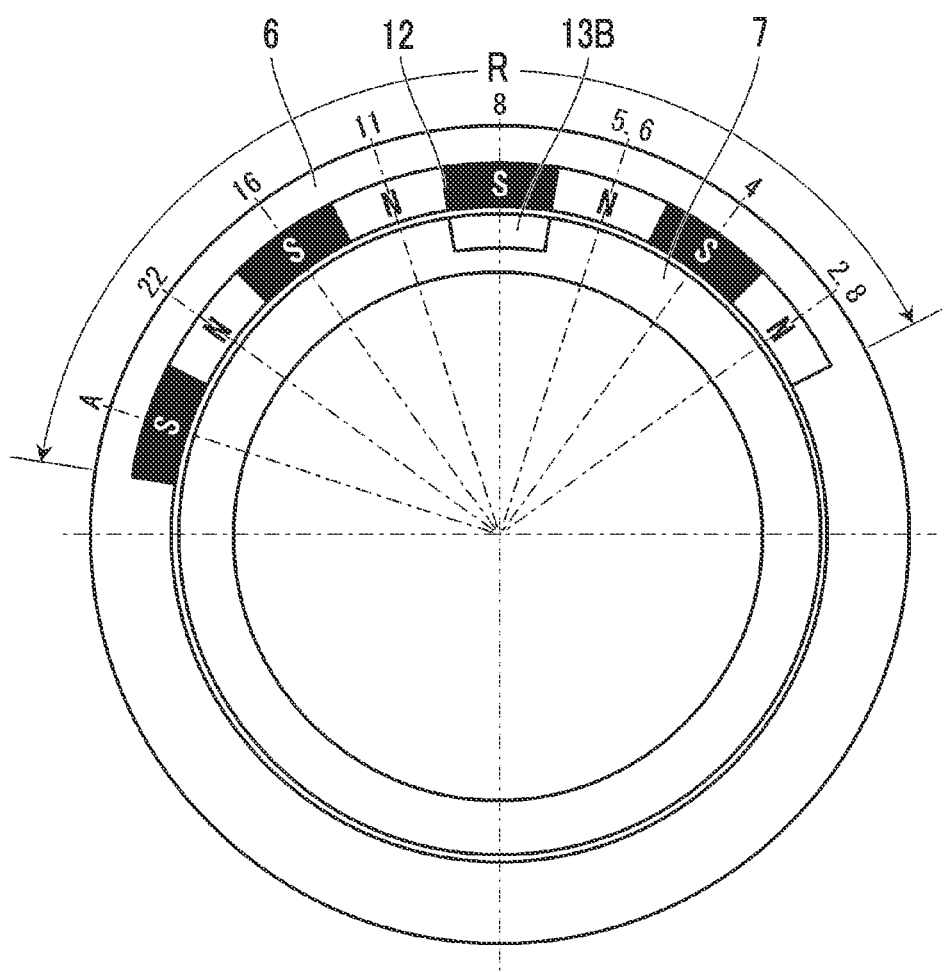
FIG. 15 is a diagram illustrating the function of a click-stop.

FIG. 15 is a diagram illustrating the function of a click-stop. FIG. 15 is a diagram schematically showing a relationship between the stop ring 6, which is click-stopped by a magnetic attractive force, and the stationary frame 7. FIG. 15 shows a state where the stop ring 6 is click-stopped at the position of F8.

The stop ring 6 is operated to rotate in a movable range R. The stop ring 6 is magnetically stable at a position where the center of each magnetic pole coincides with the center of the protrusion portion 13B of the sheet metal part 13. In a case where the center of each magnetic pole is shifted from this position, a force returning the stop ring 6 to a magnetically stable state acts on the stop ring 6. This force is transmitted to an operator as click feeling. Further, in a case where a force for rotating the stop ring 6 is cancelled, the stop ring 6 is automatically stopped at a magnetically stable point. That is, the stop ring 6 is click-stopped.

Furthermore, a magnetic attractive force acts between the body portion 13A of the sheet metal part 13 and the multipolar magnet 12 even in the lens barrel 1 according to this embodiment. For this reason, the stop ring 6 is attracted toward the flange 8 even in the lens barrel 1 according to this embodiment. That is, backlash is removed. Accordingly, since backlash accompanying the mounting of the stop ring 6 is removed, a stable rotating operation can be always achieved.

Modification Examples

[Case where Click Feeling to be Generated Varies Depending on Position]

Configuration where the same click feeling is generated at all positions has been employed in the embodiments, but click feeling to be generated can also vary depending on a position. Accordingly, since the set state of the stop ring 6 can be grasped from click feeling transmitted to a finger, operability can be improved.

For example, F numbers that can be selected in a case where an F number is switched by one step are defined as "main set values", and F numbers that can be selected only in a case where an F number is switched by ⅓ step are defined as "sub-set values". In this case, F numbers obtained in a case where the main set values are excluded from F numbers that can be selected in a case where an F number is set to be switched by ⅓ step are the sub-set values. For example, in the range of F2.8 to F22, F2.8, F4, F5.6, F8, F11, F16, and F22 are the main set values and F3.2, F3.5, F4.5, F5, F6.3, F7.1, F9, F10, F13, F14, F18, and F20 are the sub-set values.

In a case where the main set values and the sub-set values are set in this way, click feeling to be generated at the positions of the main set values and click feeling to be generated at the positions of the sub-set values can vary.

The strength of click feeling to be generated at each position can be adjusted through the adjustment of the magnitude of a magnetic attractive force to be generated at each position. For example, in a case where click feeling to be generated at the position of the main set value is to be stronger than click feeling to be generated at the position of the sub-set value, a magnetic attractive force to be generated at the position of the main set value is set to be stronger than a magnetic attractive force to be generated at the position of the sub-set value.

A magnetic attractive force to be generated at each position can be adjusted through the variation of the size of clearance Δd between the multipolar magnet 12 and the protrusion portion 13B. For example, in a case where click feeling to be generated at the position of the main set value is to be stronger than click feeling generated to be at the position of the sub-set value, clearance formed at a portion corresponding to the main set value is set to be narrower than clearance formed at a portion corresponding to the sub-set value. Accordingly, strong click feeling is generated at a portion corresponding to the main set value.

Figure 16:
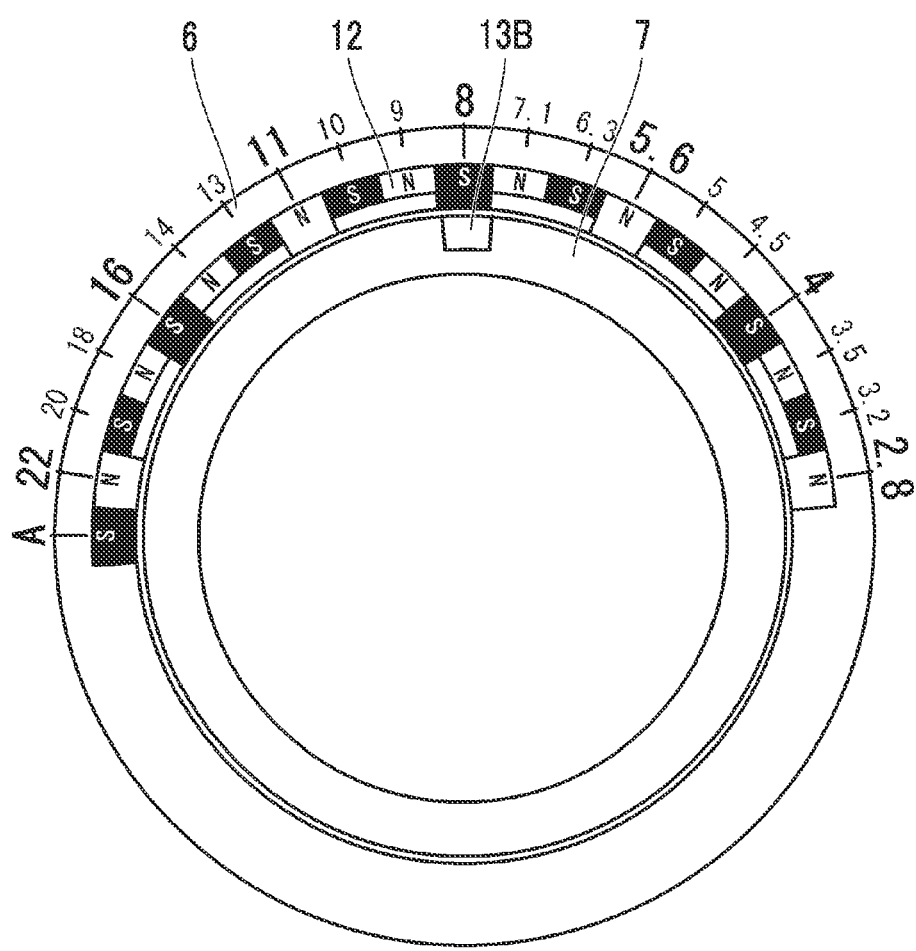
FIG. 16 is a diagram schematically showing a relationship between a multipolar magnet and a protrusion portion in a case where click feeling varies depending on the adjustment of clearance.
Figure 17:
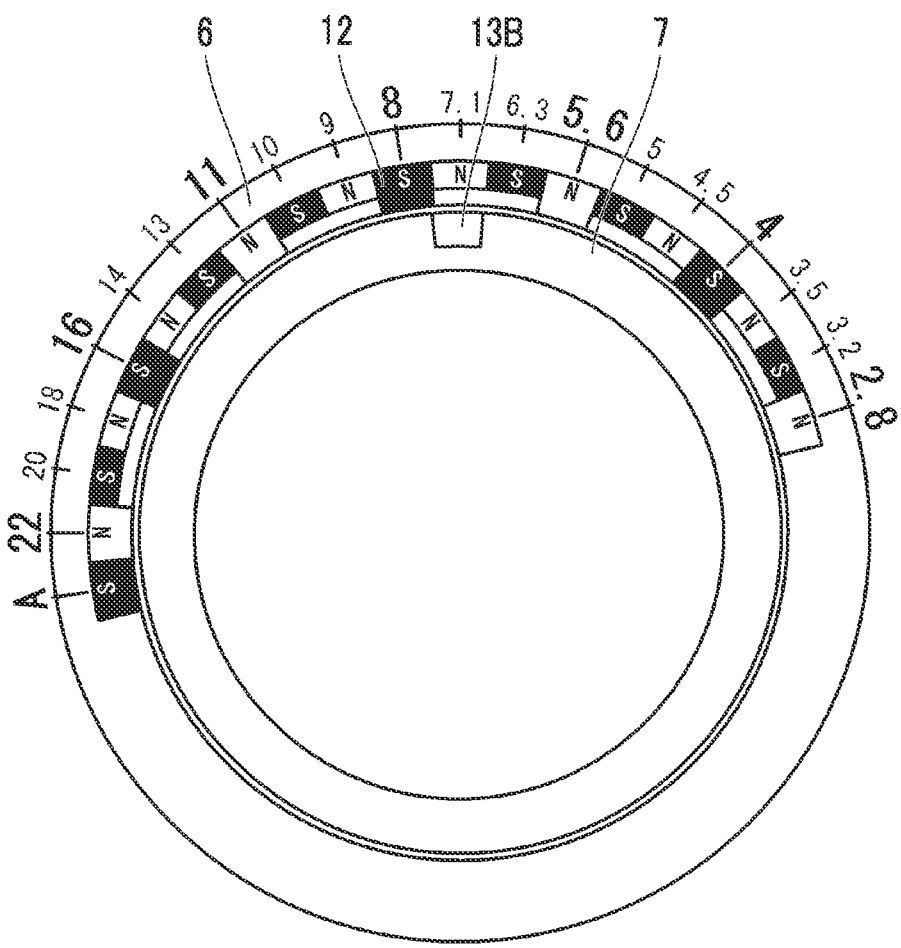
FIG. 17 is a diagram schematically showing a relationship between the multipolar magnet and the protrusion portion in a case where click feeling varies depending on the adjustment of clearance.

FIGS. 16 and 17 are diagrams schematically showing a relationship between the multipolar magnet and the protrusion portion in a case where click feeling varies depending on the adjustment of clearance. FIGS. 16 and 17 show an example in a case where strong click feeling is generated at the positions of the main set values. FIG. 16 shows a state where the stop ring 6 is click-stopped at the position of the main set value, and FIG. 17 shows a state where the stop ring 6 is click-stopped at the position of the sub-set value.

In a case where strong click feeling is to be generated at the positions of the main set values, the height of each of portions (the thickness of the stop ring 6 in a radial direction) corresponding to the main set values (F2.8, F4, F5.6, F8, F11, F16, and F22) is set to be higher than the height of each of portions corresponding to the sub-set values (F3.2, F3.5, F4.5, F5, F6.3, F7.1, F9, F10, F13, F14, F18, and F20) as shown in FIGS. 16 and 17. Accordingly, clearance formed at a portion corresponding to the main set value is narrower than clearance formed at a portion corresponding to the sub-set value, and a strong magnetic attractive force is generated at the position of the main set value. As a result, different click feeling is generated between the main set value and the sub-set value.

In this example, a magnetic pole portion disposed at each of the positions of the main set values is an example of a first magnet portion and a magnetic pole portion disposed at each of the positions of the sub-set values is an example of a second magnet portion. Further, the arrangement interval of the main set values is an example of a first angular interval, and the arrangement interval of the sub-set values is an example of a second angular interval. The sub-set values are arranged between the adjacent main set values at regular angular intervals (second angular interval).

Configuration where a magnetic attractive force to be generated at each position is adjusted through the adjustment of clearance has been employed in the example, but a method of adjusting a magnetic attractive force to be generated at each position is not limited thereto. For example, a magnetic attractive force can also be adjusted by the variation of the area of a surface facing the protrusion portion 13B. In this case, the area of a region overlapping with the protrusion portion 13B varies at a portion corresponding to a main set value and a portion corresponding to a sub-set value. Since this area varies, a magnetic attractive force to be generated varies.

Figure 18:
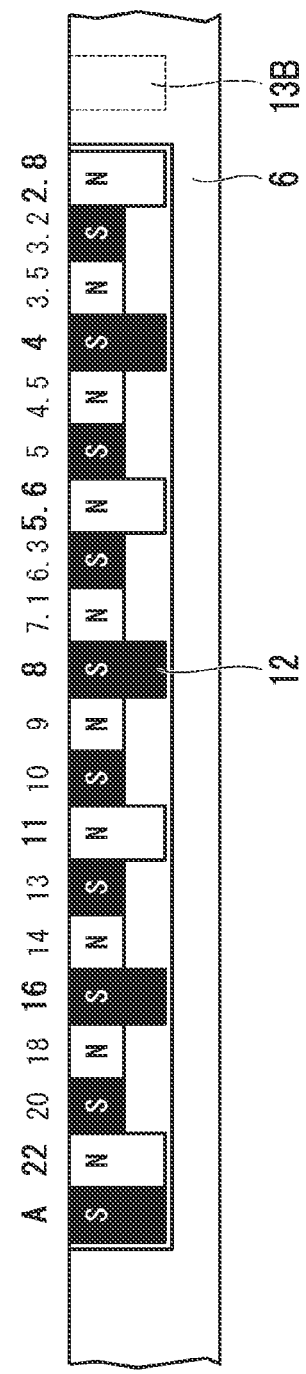
FIG. 18 is a diagram showing an example of the configuration of a multipolar magnet in a case where a magnetic attractive force is adjusted through the variation of the area of a region overlapping with the protrusion portion.

FIG. 18 is a diagram showing an example of the configuration of a multipolar magnet in a case where a magnetic attractive force is adjusted through the variation of the area of a region overlapping with the protrusion portion. FIG. 18 is a diagram where the multipolar magnet 12 is developed in a plane.

In a case where click feeling to be generated at each main set value is to be stronger than click feeling to be generated at each sub-set value, the area of each of portions, which correspond to the main set values (F2.8, F4, F5.6, F8, F11, F16, and F22), of a surface facing the protrusion portion 13B is set to be larger than the area of each of portions, which correspond to the sub-set values (F3.2, F3.5, F4.5, F5, F6.3, F7.1, F9, F10, F13, F14, F18, and F20), thereof as shown in FIG. 18. In the example shown in FIG. 18, the areas of the portions corresponding to the main set values and the areas of the portions corresponding to the sub-set values vary depending on the adjustment of a length in the direction of the optical axis.

As described above, click feeling can also vary through the variation of the areas of the portions corresponding to the main set values and the areas of the portions corresponding to the sub-set values.

Even in a case where the stop ring 6 is operated to rotate endlessly, click feeling may vary at regular angular intervals. For example, strong click feeling may be adapted to be generated at an interval of one click, or strong click feeling may be adapted to be generated at an interval of two clicks.

[Modification Example of Magnet Portion]

Configuration where a plurality of magnet portions are provided on the stop ring 6 using the multipolar magnet has been employed in the embodiments, but the configuration of the magnet portions provided on the stop ring 6 is not limited thereto.

Figure 19:
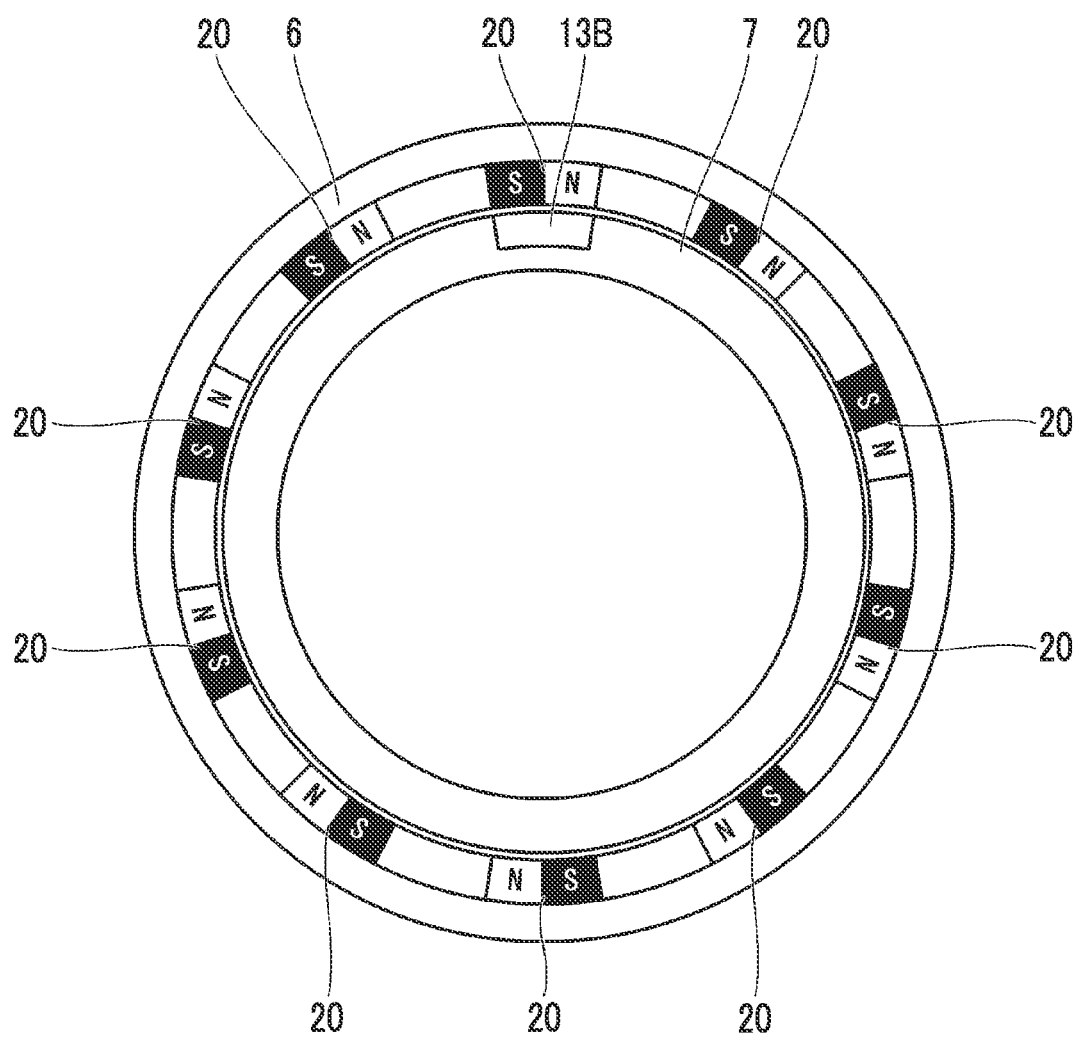
FIG. 19 is a diagram schematically showing another example of magnet portions provided on the stop ring.

FIG. 19 is a diagram schematically showing another example of magnet portions provided on the stop ring.

As shown in FIG. 19, a plurality of magnets 20 can also be arranged at regular angular intervals in a circumferential direction. In this case, each magnet 20 forms magnet portions.

Further, in a case where the stop ring is formed of a resin-molded product, the magnet portions can also be integrally molded with the stop ring. For example, in a case where the magnet portions are formed of a ferrite magnet, a samarium cobalt magnet, a neodymium magnet, or the like, the magnet portions can be integrally molded with the stop ring by insert molding. Furthermore, for example, a portion of each magnet is molded in two colors using a bonded magnet (also referred to as a plastic magnet), and each magnet portion can also be integrally molded with the stop ring. For example, the inner peripheral portion of the stop ring is molded in two colors using a bonded magnet and is magnetized to have multiple poles, so that the magnet portions can be integrally molded.

In addition, for example, a sheet-like rubber magnet, which is magnetized to have multiple poles, can also be attached to the inner peripheral portion of the stop ring to provide magnet portions on the stop ring.

Modification Examples of First Magnetic Portion and Second Magnetic Portion

In the embodiments, the first magnetic portion and the second magnetic portion are formed of an integrally molded product as the sheet metal part 13. However, the first magnetic portion and the second magnetic portion can also be formed of separate parts. Since the first magnetic portion and the second magnetic portion are formed of an integrally molded product, the first magnetic portion and the second magnetic portion can be easily assembled to the stationary frame.

In a case where the stationary frame is formed of a resin-molded product, the stationary frame can also be formed as an integrally molded product in which the first magnetic portion and the second magnetic portion are insert-molded.

Further, the first magnetic portion can also be formed of a magnet.

Figure 20:
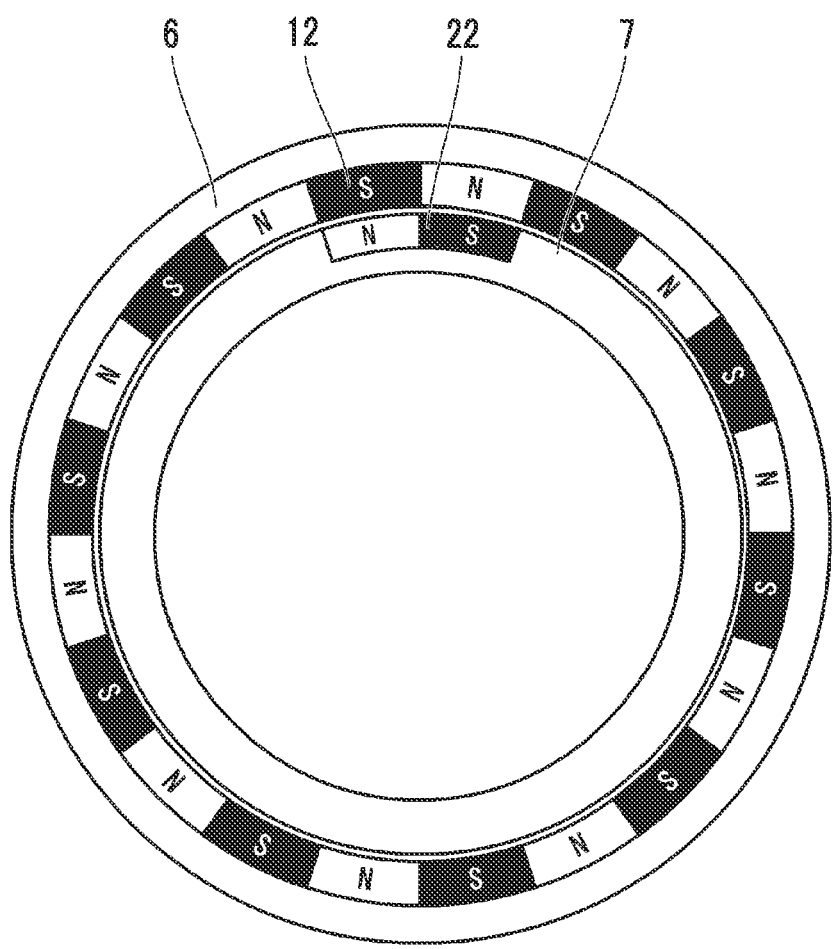
FIG. 20 is a diagram schematically showing an example of a case where a first magnetic portion is formed of a magnet.

FIG. 20 is a diagram schematically showing an example of a case where the first magnetic portion is formed of a magnet.

As shown in FIG. 20, a magnet 22 is disposed on the outer peripheral surface of the stationary frame 7. In this case, the stop ring 6 is magnetically stable and click-stopped at a position where the N pole of the magnet 22 faces the S pole of the multipolar magnet 12 (a position where the S pole of the magnet 22 faces the N pole of the multipolar magnet 12).

In a case where the stationary frame is formed of a resin-molded product, a portion of the magnet 22 can be molded in two colors using a bonded magnet and can also be integrally molded with the stationary frame.

Modification Example of End Face-Contact Portion

Configuration where the end face-contact portion is integrally molded with the stationary frame 7 as the flange 8 has been employed in the embodiments, but the end face-contact portion can also be formed of a separate part. For example, a ring-shaped member separately mounted on the stationary frame can also be used as the end face-contact portion.

Further, balls can also be assembled to the rear end face 8A of the flange 8 in order to reduce sliding friction during the rotation of the stop ring 6. It is preferable that the balls are arranged at regular intervals in the circumferential direction.

Modification Example of Rotation Detection Unit

Configuration where the change of magnetic flux generated by the multipolar magnet 12 provided on the stop ring 6 is detected by the MR sensor 14 to detect the rotation of the stop ring 6 corresponding to each click has been employed in the embodiments, but means for detecting the rotation of the stop ring 6 is not limited thereto. In addition, configuration where the rotation and the rotational position of the stop ring 6 are detected using a publicly known position sensor that includes a code plate and a contact brush can also be employed.

In order to detect even the rotation direction of the stop ring in a case where the rotation of the stop ring corresponding to each click is detected using an MR sensor, two MR sensors are used.

Modification Example of Relationship Between Magnet Portion and Magnetic Portion Configuration where the magnetic portion (the first magnetic portion and the second magnetic portion) is provided on the stationary frame and the magnet portions are provided on the stop ring has been employed in the embodiments, but configuration where a magnet portion (first magnet portions and second magnet portions) is provided on the stationary frame and a magnetic portion is provided on the stop ring can also be employed.

Figure 21:
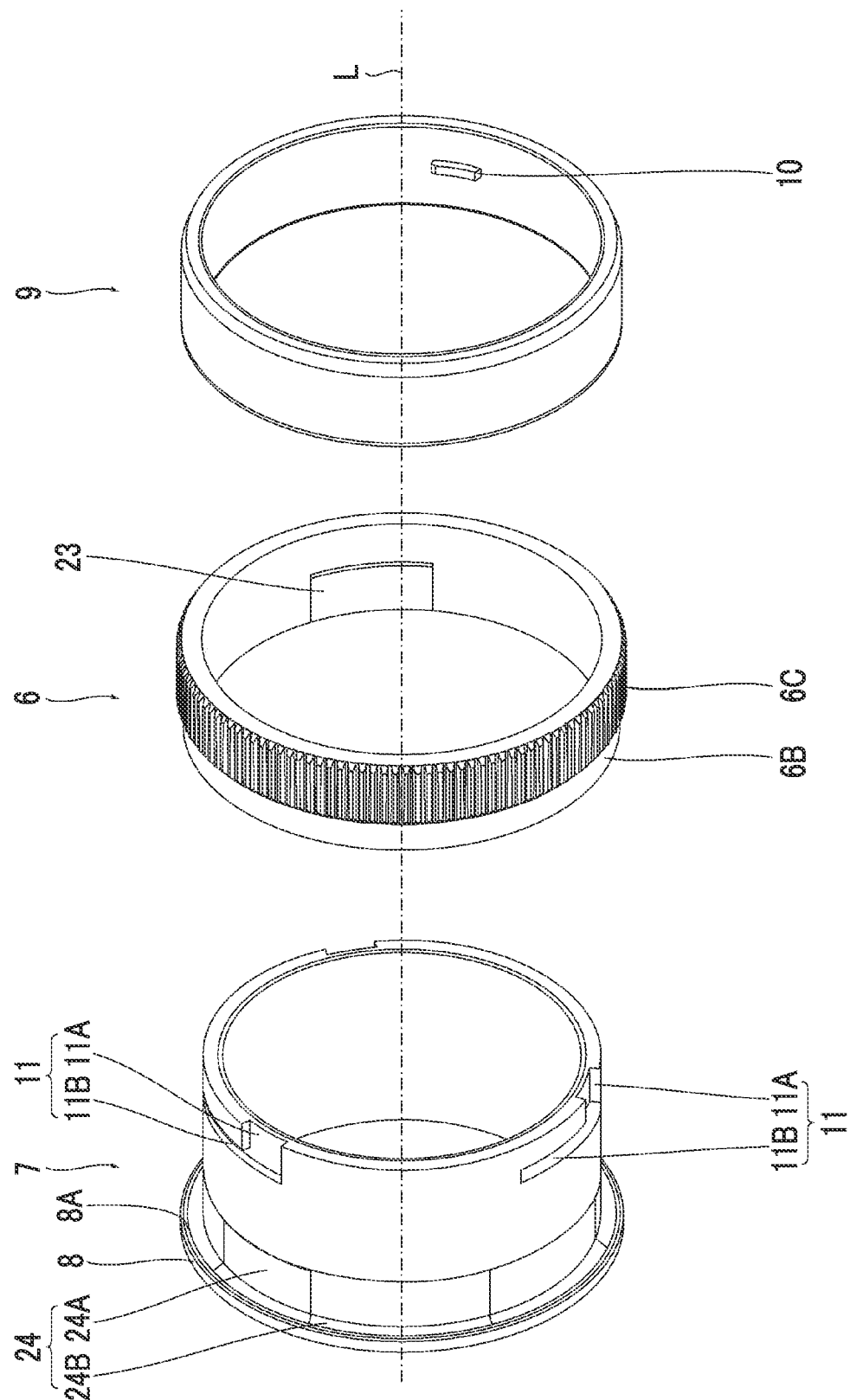
FIG. 21 is an exploded perspective view showing an example of the configuration of the mounting portion of the stop ring in a case where a magnet portion is provided on a stationary frame and a magnetic portion is provided on a stop ring.

FIG. 21 is an exploded perspective view showing an example of the configuration of the mounting portion of the stop ring in a case where a magnet portion is provided on a stationary frame and a magnetic portion is provided on a stop ring.

As shown in FIG. 21, a sheet metal part 23 is provided on the stop ring 6 as the magnetic portion. The sheet metal part 23 is provided on the inner peripheral portion of the stop ring 6.

On the other hand, a multipolar magnet 24 magnetized to have multiple poles at regular angular intervals in a circumferential direction is provided on the stationary frame 7 as the magnet portion. The multipolar magnet 24 includes a cylindrical portion 24A and a flange portion 24B. The cylindrical portion 24A is provided on the outer peripheral portion of the stationary frame 7. Each of magnetic pole portions of the cylindrical portion 24A is an example of a first magnet portion. The flange portion 24B is provided on a rear end face 8A of the flange 8 integrally provided on the stationary frame 7. The flange portion 24B is an example of a second magnet portion.

In a case where the stop ring 6 is assembled to the stationary frame 7, the inner peripheral portion of the sheet metal part 23 provided on the stop ring 6 is disposed so as to face the cylindrical portion 24A of the multipolar magnet 24 provided on the stationary frame 7. As a result, in a case where the stop ring 6 is rotated, click feeling is generated for the rotation of the stop ring 6 by a magnetic attractive force acting between the cylindrical portion 24A of the multipolar magnet 24 and the sheet metal part 23.

Further, in a case where the stop ring 6 is assembled to the stationary frame 7, the front end face of the sheet metal part 23 is disposed so as to face the flange portion 24B of the multipolar magnet 24. As a result, a force for attracting the stop ring 6 toward the flange 8 of the stationary frame 7 is generated by a magnetic attractive force acting between the flange portion 24B of the multipolar magnet 24 and the sheet metal part 23. Accordingly, the backlash of the stop ring 6 is removed.

Even in a case where configuration where the magnet portion (the first magnet portion and the second magnet portion) is provided on the stationary frame and the magnetic portion (sheet metal part 23) is provided on the stop ring is employed as described above, the stop ring 6 can be click-stopped at regular angular intervals and backlash can be removed.

The first magnet portion (the cylindrical portion 24A of the multipolar magnet 24) and the second magnet portion (the flange portion 24B of the multipolar magnet 24) are formed as an integrally molded product in this example, but the first magnet portion and the second magnet portion can also be formed of separate parts.

Further, the magnetic portion is formed of the sheet metal part 23, which is a ferromagnetic body, in the example, but can also be formed of a magnet.

Furthermore, even in a case where configuration where the magnet portion is provided on the stationary frame and the magnetic portion is provided on the stop ring is employed as in this example, it is preferable that a magnetic attractive force acting between the second magnet portion (the flange portion 24B of the multipolar magnet 24) and the magnetic portion (the sheet metal part 23) is set to be smaller than a magnetic attractive force acting between the first magnet portion (the cylindrical portion 24A of the multipolar magnet 24) and the magnetic portion (the sheet metal part 23). Accordingly, since friction acting between the stop ring 6 and the flange 8 can be reduced, a smoother rotating operation can be achieved.

Moreover, even in a case where configuration where the magnet portion is provided on the stationary frame and the magnetic portion is provided on the stop ring is employed as in this example, configuration where click feeling can vary depending on a position can be employed. That is, click feeling can vary at the positions of the main set values and the positions of the sub-set values. In this case, a magnetic attractive force to be generated at the position of the main set value and a magnetic attractive force to be generated at the position of the sub-set value are made to vary. For example, in a case where click feeling to be generated at the position of the main set value is to be stronger than click feeling to be generated at the position of the sub-set value, a magnetic attractive force to be generated at the position of the main set value is set to be larger than a magnetic attractive force to be generated at the position of the sub-set value. The adjustment of a magnetic attractive force acting between the cylindrical portion 24A of the multipolar magnet 24 (the first magnet portion) and the sheet metal part 23 (the magnetic portion) is performed through the adjustment of the size of clearance formed between the cylindrical portion 24A of the multipolar magnet 24 and the sheet metal part 23 and/or the area of a region overlapping with the cylindrical portion 24A of the multipolar magnet 24 and the sheet metal part 23. In this case, the magnetic pole portion disposed at the position of the main set value forms a first first magnet portion, and the magnetic pole portion disposed at the position of the sub-set value forms a second first magnet portion.

Further, even in a case where configuration where the magnet portion is provided on the stationary frame and the magnetic portion is provided on the stop ring is employed as in this example, the movable range of the stop ring 6 can be restricted by the movable range-restriction unit. In this case, the magnet portion is provided in an angular range corresponding to the movable range of the stop ring 6.

Furthermore, in a case where the stationary frame 7 is formed of a resin-molded product, the magnet portion (multipolar magnet 24) to be provided on the stationary frame can also be integrally molded with the stationary frame by insert molding. Moreover, the magnet portion can also be integrally molded with the stationary frame using a bonded magnet by two-color molding. Likewise, in a case where the stop ring 6 is formed of a resin-molded product, the magnetic portion (sheet metal part 23) can also be integrally molded with the stop ring 6 by insert molding.

Modification Example of Operation Ring

Cases where the invention is applied to the stop ring have been described in the embodiments by way of example, but the application of the invention is not limited thereto. The invention can be applied to all operation rings that are click-operated.

Modification Example of Lens Barrel

Cases where the invention is applied to a lens barrel for an interchangeable lens have been described in the embodiments by way of example, but the application of the invention is not limited thereto. The invention can also be applied to a lens barrel of a camera integrated with lenses. Further, the invention can also be applied to lens barrels of not only an imaging device but also optical devices, such as a microscope, a telescope, and binoculars.

EXPLANATION OF REFERENCES

1: lens barrel
2: lens barrel body
3: mount
4: focus ring
5: zoom ring
6: stop ring
6A: front end face of stop ring
6B: smooth portion provided on outer periphery of stop ring
6C: knurled portion provided on outer periphery of stop ring
6D: recessed portion provided on inner periphery of stop ring
6E: movable range-restriction claw
7: stationary frame
7A: recessed portion provided on outer periphery of stationary frame
7B: sensor mounting portion
7C: movable range-restriction groove
8: flange
8A: rear end face of flange
8B: recessed portion provided on rear end face of flange
9: pressing ring
10: locking claw portion
11: locking groove portion
11A: inlet portion of locking groove portion
11B: locking portion of locking groove portion
12: multipolar magnet
12A: front end face of multipolar magnet
13: sheet metal part
13A: body portion of sheet metal part
13B: protrusion portion of sheet metal part
14: MR sensor 20: magnet
22: magnet
23: sheet metal part
24: multipolar magnet
24A: cylindrical portion of multipolar magnet
24B: flange portion of multipolar magnet
F: force
I: index
L: optical axis
R: movable range
Δd: clearance

What is claimed is:

1. A lens barrel comprising:
a stationary frame;
an operation ring that is radially fitted to an outer periphery of the stationary frame and rotatable around an optical axis of the lens barrel with respect to the stationary frame;
an end face-contact portion which is provided on the stationary frame and with which an end face of the operation ring is in contact;
a plurality of magnet portions that are provided on the operation ring at regular angular intervals around the optical axis in a circumferential direction;
a first magnetic portion that is provided on an outer peripheral surface of the stationary frame, and in a case where the operation ring is rotated around the optical axis with respect to the stationary frame, causes the operation ring to be click-stopped by a magnetic attractive force acting between the first magnetic portion and one of the magnet portions that passes by the first magnetic portion; and
a second magnetic portion that is provided on the end face-contact portion and attracts the operation ring to the end face-contact portion by a magnetic attractive force acting between the second magnetic portion and each of the magnet portions to cause the operation ring to be in contact with the end face-contact portion while allowing each of the magnet portions to pass by the second magnetic portion in the case where the operation ring is rotated around the optical axis with respect to the stationary frame.

2. The lens barrel according to claim 1,
wherein the magnetic attractive force acting between the second magnetic portion and each of the magnet portions is set to be smaller than the magnetic attractive force acting between the first magnetic portion and each of the magnet portions.

3. The lens barrel according to claim 1,
wherein the operation ring is formed of an integrally molded product in which the magnet portions are insert-molded and which is made of a resin.

4. The lens barrel according to claim 1,
wherein the operation ring is formed of an integrally molded product in which the magnet portions are molded in two colors using a bonded magnet and which is made of a resin.

5. The lens barrel according to claim 1,
wherein the stationary frame and the end face-contact portion are formed of an integrally molded product in which the first magnetic portion and the second magnetic portion are insert-molded and which is made of a resin.

6. The lens barrel according to claim 1,
wherein the first magnetic portion and the second magnetic portion are formed of an integrally molded product made of a magnetic material.

7. The lens barrel according to claim 6,
wherein the second magnetic portion has a shape of a ring or an arc that is radially fitted to the outer periphery of the stationary frame, and
the first magnetic portion has a shape of a plate that extends in a direction of the optical axis along an outer peripheral surface of the stationary frame from the second magnetic portion.

8. The lens barrel according to claim 1,
wherein each of the first magnetic portion and the second magnetic portion is formed of a ferromagnetic body.

9. The lens barrel according to claim 1,
wherein the magnet portions are formed of a ring-shaped or arcuate multipolar magnet that is magnetized to have multiple poles in the circumferential direction.

10. The lens barrel according to claim 1, further comprising:
a rotation detection unit that detects a change of magnetic flux caused by a rotation of the operation ring to detect the rotation of the operation ring corresponding to each click.

11. The lens barrel according to claim 1,
wherein the magnet portions include a plurality of first magnet portions that are provided at a first angular interval in the circumferential direction, and a plurality of second magnet portions that are provided at a second angular interval between the adjacent first magnet portions, and
a magnetic attractive force acting between each of the first magnet portions and the first magnetic portion is set to be larger than a magnetic attractive force acting between each of the second magnet portions and the first magnetic portion.

12. The lens barrel according to claim 11,
wherein clearance provided between each of the first magnet portions and the first magnetic portion is set to be narrower than clearance provided between each of the second magnet portions and the first magnetic portion, so that the magnetic attractive force acting between each of the first magnet portions and the first magnetic portion is set to be larger than the magnetic attractive force acting between each of the second magnet portions and the first magnetic portion.

13. The lens barrel according to claim 11,
wherein an area of a region where each of the first magnet portions and the first magnetic portion overlap with each other is set to be larger than an area of a region where each of the second magnet portions and the first magnetic portion overlap with each other, so that the magnetic attractive force acting between each of the first magnet portions and the first magnetic portion is set to be larger than the magnetic attractive force acting between each of the second magnet portions and the first magnetic portion.

14. The lens barrel according to claim 1, further comprising:
a rotatable range-restriction unit that restricts a rotatable range of the operation ring around the optical axis with respect to the stationary frame,
wherein the magnet portions are provided in an angular range around the optical axis corresponding to the rotatable range of the operation ring.

15. A lens barrel comprising:

a stationary frame;

an operation ring that is radially fitted to an outer periphery of the stationary frame and rotatable around an optical axis of the lens barrel with respect to the stationary frame;

an end face-contact portion which is provided on the stationary frame and with which an end face of the operation ring is in contact;

a magnetic portion that is provided on the operation ring;

first magnet portions that are provided on an outer peripheral surface of the stationary frame at regular angular intervals around the optical axis in a circumferential direction, and in a case where the operation ring is rotated around the optical axis with respect to the stationary frame, cause the operation ring to be click-stopped by a magnetic attractive force acting between the magnetic portion and one of the first magnet portions that the magnetic portion passes by; and second magnet portions that are provided on the end face-contact portion at regular angular intervals around the optical axis in the circumferential direction and attract the operation ring to the end face-contact portion by a magnetic attractive force acting between the magnetic portion and each of the second magnet portions to cause the operation ring to be in contact with the end face-contact portion while allowing the magnetic portion to pass by each of the second magnet portions in the case where the operation ring is rotated around the optical axis with respect to the stationary frame.

16. The lens barrel according to claim 15, wherein the magnetic attractive force acting between each of the second magnet portions and the magnetic portion is set to be smaller than the magnetic attractive force acting between each of the first magnet portions and the magnetic portion.

17. The lens barrel according to claim 15, wherein the stationary frame and the end face-contact portion are formed of an integrally molded product in which the first magnet portions and the second magnet portions are insert-molded and which is made of a resin.

18. The lens barrel according to claim 15, wherein the stationary frame and the end face-contact portion are formed of an integrally molded product in which the first magnet portions and the second magnet portions are molded in two colors using bonded magnets and which is made of a resin.

19. The lens barrel according to claim 15, wherein the operation ring is formed of an integrally molded product in which the magnetic portion is insert-molded and which is made of a resin.

20. The lens barrel according to claim 15, wherein the magnetic portion is formed of a ferromagnetic body.

21. The lens barrel according to claim 15, wherein the first magnet portions include a plurality of first magnet sub-portions that are provided at first angular intervals in the circumferential direction, and a plurality of second magnet sub-portions that are provided at second angular intervals between the adjacent first magnet sub-portions, and a magnetic attractive force acting between each of the first magnet sub-portions and the magnetic portion is set to be larger than a magnetic attractive force acting between each of the second magnet sub-portions and the magnetic portion.

22. The lens barrel according to claim 21, wherein clearance provided between each of the first magnet sub-portions and the magnetic portion is set to be narrower than clearance provided between each of the second magnet sub-portions and the magnetic portion, so that the magnetic attractive force acting between each of the first magnet sub-portions and the magnetic portion is set to be larger than the magnetic attractive force acting between each of the second magnet sub-portions and the magnetic portion.

23. The lens barrel according to claim 21, wherein an area of a region where each of the first magnet sub-portions and the magnetic portion overlap with each other is set to be larger than an area of a region where each of the second magnet sub-portions and the magnetic portion overlap with each other, so that the magnetic attractive force acting between each of the first magnet sub-portions and the magnetic portion is set to be larger than the magnetic attractive force acting between each of the second magnet sub-portions and the magnetic portion.

24. The lens barrel according to claim 15, further comprising:

a rotatable range-restriction unit that restricts a rotatable range of the operation ring around the optical axis with respect to the stationary frame, wherein the first magnet portions and the second magnet portions are provided in an angular range around the optical axis corresponding to the rotatable range of the operation ring.

* * * * *